United States Patent
Okugawa et al.

(10) Patent No.: US 7,254,941 B2
(45) Date of Patent: Aug. 14, 2007

(54) EXHAUST GAS CLEANING DEVICE FOR INTERNAL COMBUSTION ENGINE

(75) Inventors: Shinichiro Okugawa, Toyota (JP); Kazuo Kojima, Nagoya (JP); Hiroshi Haraguchi, Kariya (JP)

(73) Assignee: DENSO Corporation (JP)

( * ) Notice: Subject to any disclaimer, the term of this patent is extended or adjusted under 35 U.S.C. 154(b) by 84 days.

(21) Appl. No.: 11/127,172

(22) Filed: May 12, 2005

(65) Prior Publication Data

US 2005/0252198 A1 Nov. 17, 2005

(30) Foreign Application Priority Data

May 12, 2004 (JP) ............... 2004-141766
Feb. 28, 2005 (JP) ............... 2005-053500

(51) Int. Cl.
*F01N 3/00* (2006.01)
*F01N 3/10* (2006.01)

(52) U.S. Cl. ............... 60/297; 60/285; 60/311
(58) Field of Classification Search ............... 60/285, 60/297, 311
See application file for complete search history.

(56) References Cited

U.S. PATENT DOCUMENTS

| | | | | |
|---|---|---|---|---|
| 5,642,705 A | * | 7/1997 | Morikawa et al. | 123/300 |
| 5,826,425 A | * | 10/1998 | Rossi Sebastiano et al. | 60/274 |
| 5,956,942 A | * | 9/1999 | Sebastiano et al. | 60/274 |
| 6,449,946 B2 | * | 9/2002 | Kuji et al. | 60/286 |
| 6,536,209 B2 | * | 3/2003 | Fluga et al. | 60/284 |
| 6,634,170 B2 | * | 10/2003 | Hiranuma et al. | 60/295 |
| 6,865,880 B2 | * | 3/2005 | Iihoshi et al. | 60/285 |
| 6,959,541 B2 | * | 11/2005 | Kosaka et al. | 60/295 |
| 2004/0035101 A1 | | 2/2004 | Imai et al. | |

FOREIGN PATENT DOCUMENTS

| | | |
|---|---|---|
| EP | 1 245 814 | 10/2002 |
| EP | 1 387 071 | 2/2004 |
| JP | 7-259533 A | 10/1995 |
| JP | 2003-172185 | 6/2003 |
| WO | WO 02/086301 | 10/2002 |

OTHER PUBLICATIONS

French Search Report.
Chinese Office Action dated Feb. 2, 2007 issued in corresponding Chinese Application No. 200510068814.X with English translation.

* cited by examiner

*Primary Examiner*—Thomas Denion
*Assistant Examiner*—Loren Edwards
(74) *Attorney, Agent, or Firm*—Nixon & Vanderhye PC

(57) ABSTRACT

In an engine, when it is determined that catalyst, which is held on a filter substrate of a particulate filter, is not in an active state, an ECU executes a fuel injection for mainly obtaining an engine power near a top dead center of a crank. Then, the ECU executes a subsequent fuel injection after lapse of a sufficient injection interval, which does not cause misfiring, to increase the temperature of exhaust gas outputted from the engine. In this way, the temperature of the filter is rapidly increased.

16 Claims, 13 Drawing Sheets

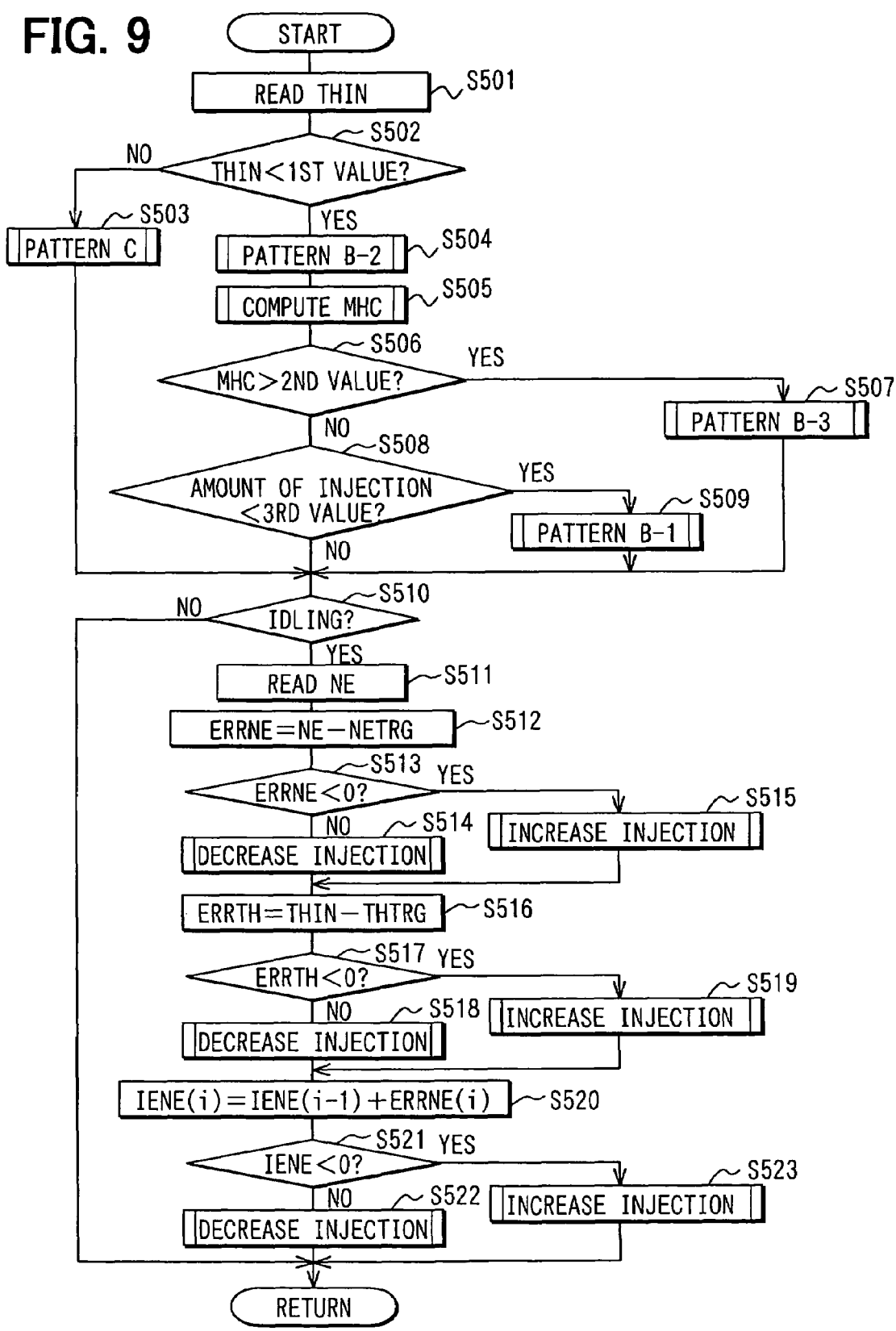

EXHAUST GAS CLEANING DEVICE FOR INTERNAL COMBUSTION ENGINE

CROSS REFERENCE TO RELATED APPLICATION

This application is based on and incorporates herein by reference Japanese Patent Application No. 2004-141766 filed on May 12, 2004 and Japanese Patent Application No. 2005-053500 filed on Feb. 28, 2005.

BACKGROUND OF THE INVENTION

1. Field of the Invention

The present invention relates to an exhaust gas cleaning device having a particulate filter for an internal combustion engine.

2. Description of Related Art

Exhaust particulate matter (PM), which is contained in exhaust gas of a diesel engine, is considered as a major environmental issue, and it has been proposed to install a diesel particulate filter (DPF) for collecting the PM in the diesel engine. The DPF is periodically regenerated by combusting and removing the collected PM to recover its performance for collecting the PM. The combustion of the PM normally requires the sufficiently high temperature of the DPF. However, in some cases, the combustion of the PM is carried out using the oxidation reaction heat generated by the oxidation catalyst. One DPF system (hereinafter referred to as an upstream catalyst type DPF system) has the oxidation catalyst, which is arranged on the upstream side of the DPF. Another DPF system (hereinafter referred to as a single DPF system) includes the DPF alone, and the catalyst is held by a filter substrate of the DPF.

In order to increase the temperature of the DPF, the temperature of the exhaust gas, which is exhausted from the engine, may be increased by throttling of the intake air, retarding of the fuel injection or increasing of the exhaust gas recirculation (EGR). Alternatively, the uncombusted component (hereinafter, also referred to as the uncombusted hydrocarbon, i.e., the uncombusted HC), which is contained in the exhaust gas exhausted from the engine, may be intentionally increased by, for example, post fuel injection to generate the catalyst reaction heat (see Japanese Unexamined Patent Publication No. 2003-172185). In each of the above cases, the energy, which is not converted into the engine power, is wasted, so that the fuel consumption needs to be concerned. When the temperature of the DPF is sufficiently high, the combustion speed is accelerated. Thus, the time required for regeneration of the DPF is shortened to advantageously reduce the fuel consumption. However, when the temperature of the DPF is rapidly increased, the DPF may be damaged. Thus, the temperature suitable for the regeneration should be used as the target temperature to maintain the temperature of the DPF.

However, with respect to the above two methods for increasing the temperature of the DPF, the one method, which increases the temperature of the exhaust gas and supplies the exhaust gas to the DPF, results in the loss of energy, which is lost through the engine or the exhaust pipe. Thus, the other method, which increases the amount of the uncombusted HC, is more advantageous in terms of the fuel consumption over the above one method. Furthermore, the single DPF system is more advantageous over the upstream catalyst type DPF system since the single DPF system can be constructed only from the DPF, thereby allowing the low manufacturing costs and the low weight.

However, in the single DPF system, when the method of increasing the uncombusted HC is used, the following disadvantageous point exists. That is, in the catalyst upstream type DPF system, the exhaust gas, which has the increased temperature due the catalytic reaction heat, is supplied to the DPF. In contrast, in the single DPF system, the catalytic reaction of the uncombusted HC occurs upon entering of the uncombusted HC in the DPF. FIG. 16 shows a relationship between the temperature of the DPF and the reaction speed for oxidizing the HC. When the temperature of the DPF is increased, the activation level of the catalyst is increased to accelerate the reaction speed. However, when the temperature of the DPF is below a predetermined temperature, the catalyst is not activated effectively, so that the HC cannot be sufficiently combusted. The temperature of the DPF needs to be equal to or higher than 600 degree Celsius to achieve the stable effective combustion of the PM. When the large amount of uncombusted HC is exhausted from the engine at the low temperature of the exhaust gas, the unreacted HC may adhere to the catalyst to cause poisoning of the catalyst. Thus, in the case of the single DPF system, the temperature increase, which is caused by the catalyst reaction of the uncombusted HC, does not substantially occur at or near the front end surface of the DPF, which is the upstream end of the DPF. Thus, there exists the temperate gradient, in which the temperature increases from the upstream end of the DPF toward the downstream end of the DPF.

As shown in FIG. 17, in the case where the exhaust gas temperature at the entry of the DPF is equal to or less than the predetermined temperature (hereinafter, referred to as the regenerative temperature), above which the amount of combusted PM is greater than the amount of exhaust PM outputted from the engine, and the temperature gradient is held steady, the temperature at the upstream end of the DPF will not become equal to or greater than the regenerative temperature. Thus, the collected PM, which is collected at the upstream end of the DPF, cannot be sufficiently combusted and cannot be sufficiently removed. As a result, the upstream end of the DPF may be clogged by the PM. With reference to FIG. 18, the above state may be encountered in the low load range of the engine, which occurs at the time of the idling state of the engine or of the low traveling speed of the vehicle where the exhaust gas temperature cannot be increased to the regenerative temperature.

Thus, in that operational range of the engine, the temperature of the exhaust gas, which is outputted from the engine, should be increased to make the temperature of the exhaust gas at the entry to the DPF equal to or greater than the regenerative temperature to avoid clogging of the DPF and/or the poisoning of the catalyst of the DPF. However, the method for increasing the exhaust gas temperature by, for example, throttling the intake air, is limited to a range, which does not cause misfiring. Thus, the temperature increase is limited to the unsatisfactory level.

SUMMARY OF THE INVENTION

The present invention addresses the above disadvantage. Thus, it is an objective of the present invention to provide an exhaust gas cleaning device of an internal combustion engine, which can effectively regenerate a particulate filter while achieving relatively low fuel consumption.

To achieve the objective of the present invention, there is provided an exhaust gas cleaning device for an internal combustion engine. The exhaust gas cleaning device includes a particulate filter, a catalyst activation level sensing means and an injection pattern selecting means. The particulate filter includes a filter substrate, which holds catalyst thereon for combusting and removing particulate matter through use of reaction heat of oxidation reaction of the catalyst to regenerate the particulate filter upon capturing of the particulate matter of exhaust gas exhausted from the internal combustion engine. The catalyst activation level sensing means is for sensing an activation level of the catalyst. The injection pattern selecting means is for selecting one of first to third injection patterns. The first injection pattern is for performing a single fuel injection per heat cycle of the internal combustion engine and is for mainly generating an output power of the internal combustion engine. The second injection pattern is for performing multiple fuel injections in multiple injection stages, respectively, per heat cycle of the internal combustion engine. A first one of the multiple fuel injections of the second injection pattern is substantially the same as the fuel injection of the first injection pattern. The multiple fuel injections of the second injection pattern further include at least one subsequent fuel injection, which is performed on a retarded side of the first one of the multiple fuel injections of the second injection pattern and has a higher ratio of waste heat in comparison to that of the first one of the multiple fuel injections, so that a temperature of the exhaust gas outputted from the internal combustion engine is increased, and a desired output power of the internal combustion engine is generated with the second injection pattern. The third injection pattern is for performing multiple fuel injections in multiple injection stages, respectively, per heat cycle of the internal combustion engine. A first one of the multiple fuel injections of the third injection pattern is substantially the same as the fuel injection of the first injection pattern. The multiple fuel injections of the third injection pattern further include at least one subsequent fuel injection, which is performed on a retarded side of the first one of the multiple fuel injections of the third injection pattern. An injection interval between an end point of the first one of the multiple fuel injections of the third injection pattern and a start point of a subsequent one of the at least one subsequent fuel injection of the third injection pattern is greater than that of the second injection pattern, so that a ratio of uncombusted fuel component of the exhaust gas generated upon combustion of fuel of the subsequent one of the at least one subsequent fuel injection in the third injection pattern becomes higher than that of the second injection pattern, and the thus generated uncombusted fuel component is supplied to the particulate filter, and the desired output power of the internal combustion engine is generated with the third injection pattern. The injection pattern selecting means selects one of the second and third injection patterns upon receiving a request for regenerating the particulate filter. The injection pattern selecting means selects the second injection pattern when the activation level of the catalyst, which is sensed by the catalyst activation level sensing means, is relatively low and thereby is equal to or less than a threshold value.

BRIEF DESCRIPTION OF THE DRAWINGS

The invention, together with additional objectives, features and advantages thereof, will be best understood from the following description, the appended claims and the accompanying drawings in which:

FIG. 9 is a flow chart showing a control operation executed in the ECU of the exhaust gas cleaning device of the embodiment;

DETAILED DESCRIPTION OF THE INVENTION

Figure 1:
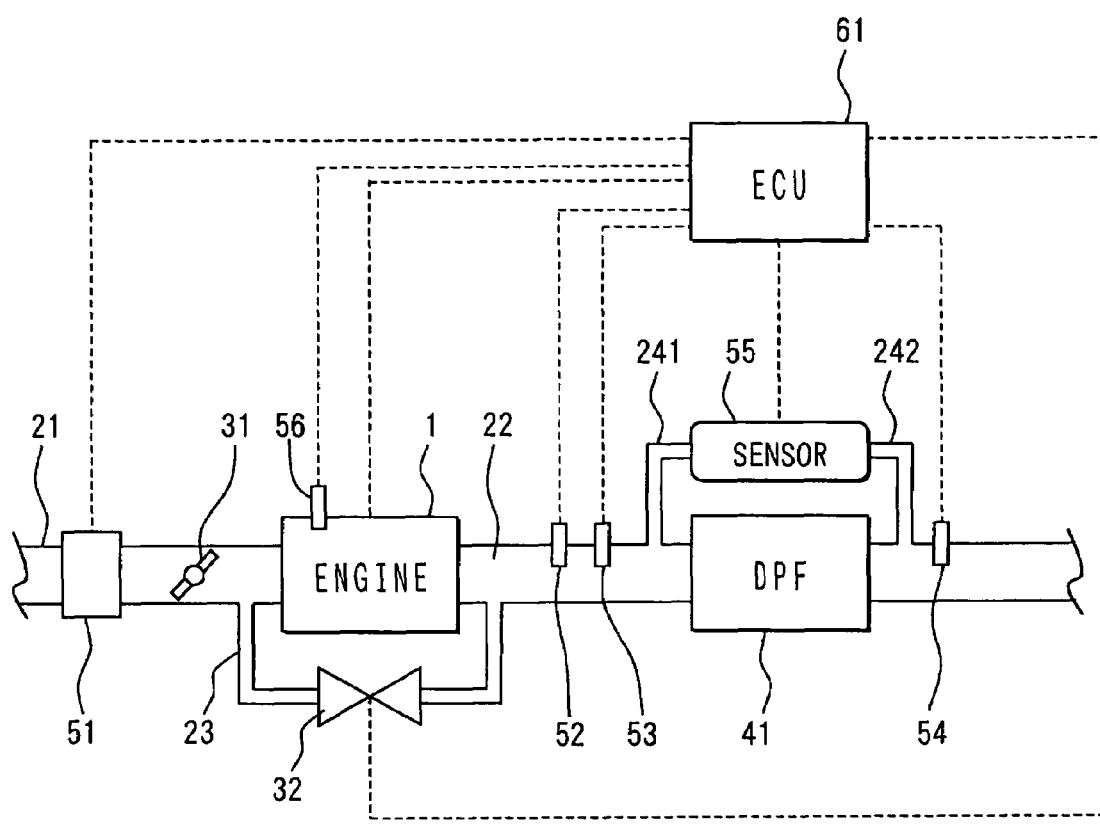
FIG. 1 is a schematic view showing a structure of an exhaust gas cleaning device for an internal combustion engine according to an embodiment of the present invention.

An embodiment of the present invention will be described with reference to the accompanying drawings. FIG. 1 shows an entire structure of a diesel engine system (an internal combustion engine) having an exhaust gas cleaning device according to the embodiment of the present invention. The engine 1, which has the exhaust gas cleaning device, is of an exhaust gas recirculation (EGR) type. In the engine 1, an EGR passage 23 connects between an air intake passage 21 and an exhaust gas passage 22 to recirculate a portion of the exhaust gas of the exhaust gas passage 22 to the air intake passage 21. The recirculating amount of the exhaust gas is adjusted by an EGR control valve 32, which is provided in the EGR passage 23.

An air flow meter (an intake air flow sensor) 51 is arranged in the air intake passage 21 to measure the amount of intake air supplied to the engine 1. The air flow meter 51 is of a generally known type, which indicates the measured amount of intake air as a mass flow rate. An intake air throttle valve 31 is arranged in the air intake passage 21. Through adjustment of a degree of opening of the throttle valve 31, the amount of intake air supplied to the engine 1 can be changed.

A diesel particulate filter (DPF) 41 is arranged in the exhaust gas passage 22 of the engine 1. The DPF 41 includes a honeycomb structure of refractory ceramics (e.g., cordierite) as a filter substrate. Cells of the honeycomb structure, which form a gas flow passage, are alternately closed, so that inlets and outlets of the cells are alternately arranged. Furthermore, oxidation catalyst (e.g., platinum catalyst) is coated on wall surfaces of the cells. The exhaust gas, which is discharged from the engine 1, flows downward through the porous partition walls of the DPF 41, and the particulate matter (PM) is captured by and is accumulated on the partition walls.

An air to fuel ratio sensor (hereinafter, referred to as an A/F sensor) 52 for measuring an air to fuel ratio and exhaust gas temperature sensors 53, 54 for measuring the exhaust gas temperature are provided in the exhaust gas passage 22. The upstream side exhaust gas temperature sensor 53, which serves as a catalyst activation level sensing means and an exhaust gas temperature sensing means, is arranged on the upstream side of the DPF 41 to measure the temperature of the exhaust gas supplied to the DPF 41.

A differential pressure senor 55 for sensing a pressure difference between the upstream side and the downstream side of the DPF 41 is provided to determine the amount of accumulated PM, which is captured and is accumulated on the DPF 41. The differential pressure sensor 55 is interposed between a pressure guide pipe 241 and a pressure guide pipe 242. The pressure guide pipe 241 is communicated with the exhaust gas passage 22 on the upstream side of the DPF 41, and the pressure guide pipe 242 is communicated with the exhaust gas passage 22 on the downstream side of the DPF 41.

Furthermore, a rotational speed sensor 56, which serves as an engine power sensing means, is provided in the engine 1 to measure an engine rotational speed of the engine 1, which serves as a parameter that indicates an engine output power (an engine power).

An electronic control unit (ECU) 61 receives output signals of the above sensors 51-56 and of undepicted sensors. The ECU 61 computes the best amount of fuel injection, the best injection timing and the best injection pressure, which are the best for the current operational state of the respective parts to carry out a feedback control operation of the engine 1.

Figure 2:
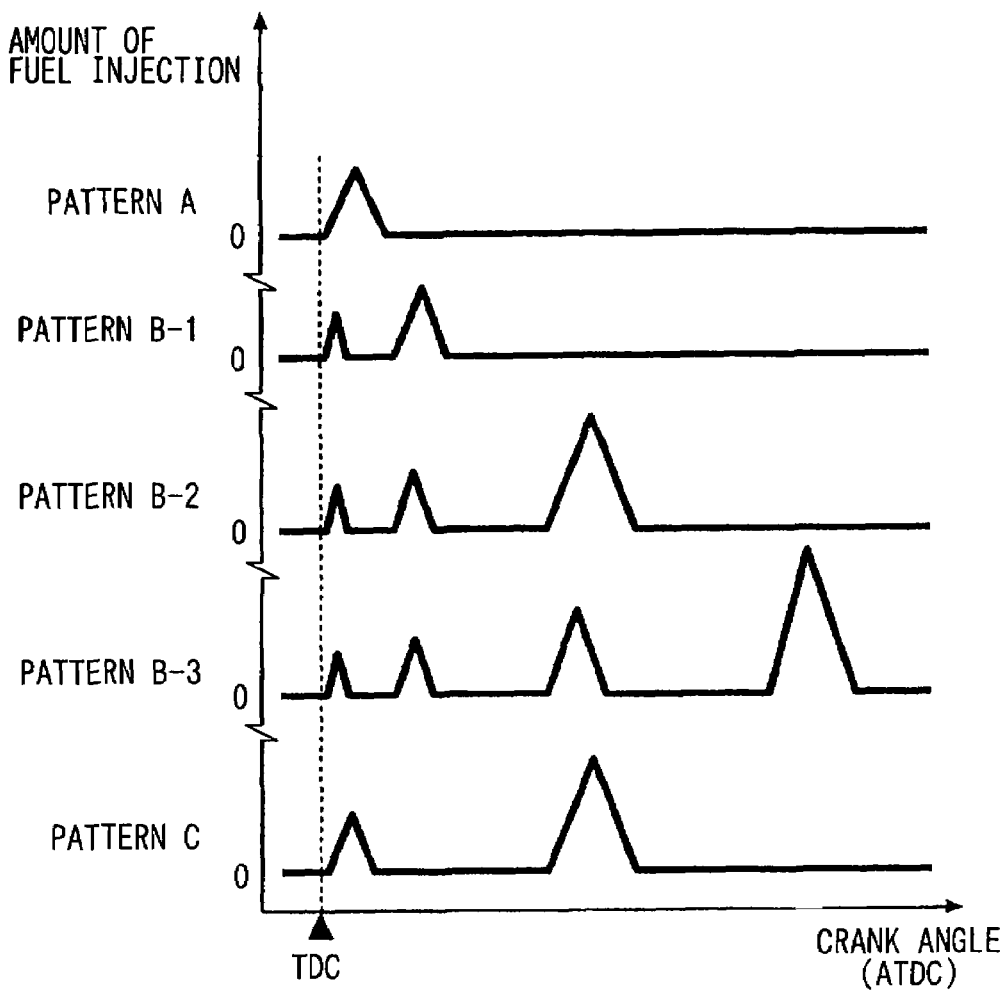
FIG. 2 is a timing chart showing injection patterns, which are performed by the exhaust gas cleaning device of the embodiment.

The ECU 61 can select a corresponding injection pattern, which corresponds to a single heat cycle of the engine 1, from various injection patterns based on the state of the engine 1 or of the DPF 41. FIG. 2 shows selectable injection patterns. These injection patterns include the injection pattern (the first injection pattern) A, the injection pattern (the second injection pattern) B-1, B-2, B-3 and the injection pattern (the third injection pattern) C. The fuel injection patters B-1 to B-3 are collectively referred to as the injection pattern B.

The injection pattern A is a injection pattern, which is mainly intended to achieve a desired engine power. Fuel is injected once near a compression top dead center (compression TDC). The energy, which is generated by combustion of the injected fuel, is converted into the engine power at the high efficiency.

Figure 3:
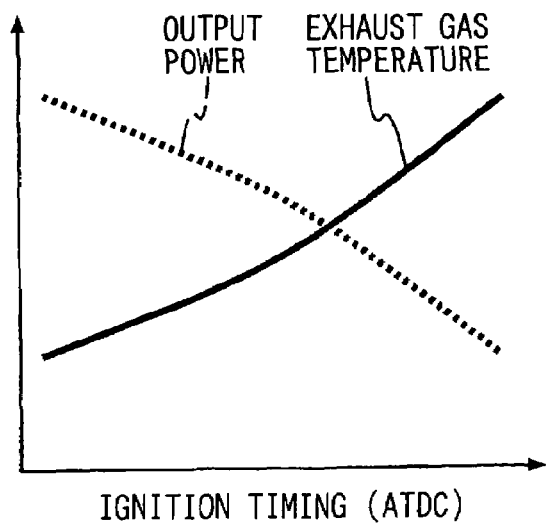
FIG. 3 is a graph showing an operation of the exhaust gas cleaning device of the embodiment.
Figure 4:
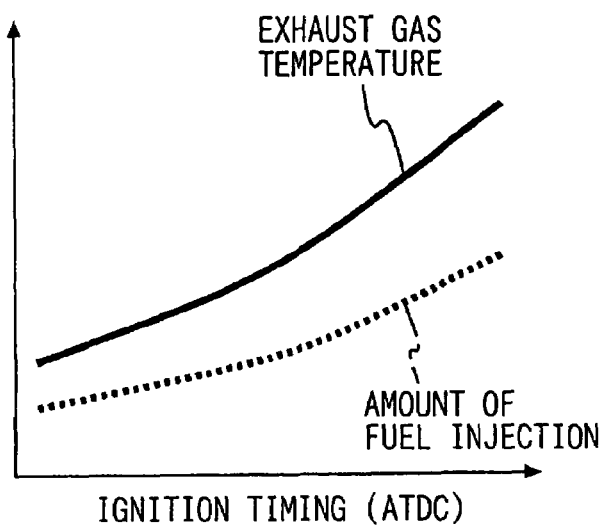
FIG. 4 is another graph showing an operation of the exhaust gas cleaning device of the embodiment.

The injection pattern B is a injection pattern, which is intended to apply sufficient thermal energy to the exhaust gas while achieving the desired engine power. The fuel is injected in multiple injection stages, starting from the point near the compression TDC on the retarded side. As shown in FIG. 3, in a case where the amount of fuel injection is kept the same, a ratio of the converted thermal energy, which is converted into the engine power, relative to the total thermal energy, which is generated by the fuel combustion, is reduced when the ignition timing is retarded. However, at the same time, i.e., when the ignition timing is retarded, the amount of waste heat is increased, so that the exhaust gas temperature is increased. Furthermore, as shown in FIG. 4, in the case where the amount of fuel injection is set to maintain the same engine power, the exhaust gas temperature can be increased by retarding the combustion of the fuel. However, when the injection timing is simply retarded, the possibility of misfiring becomes very high. The injection pattern B differs from the simple retardation of the injection timing. More specifically, in the injection pattern B, the fuel injection, which is substantially the same as the single fuel injection of the injection pattern A, is performed near the compression TDC, and thereafter, the fuel injection is performed on the retarded side of the compression TDC. The fuel injection of the latter injection stage will not cause misfiring of the fuel injected in the latter injection stage, thereby allowing ignition of the fuel even when the ignition timing is sufficiently retarded since the fuel injected in the former injection stage is combusted in the normal manner. Therefore, the misfiring limit is substantially shifted to the retarded side. In this way, the ratio of the waste heat can be increased while the ignition timing is sufficiently retarded. This is the characteristic of the injection pattern B.

Figure 5:
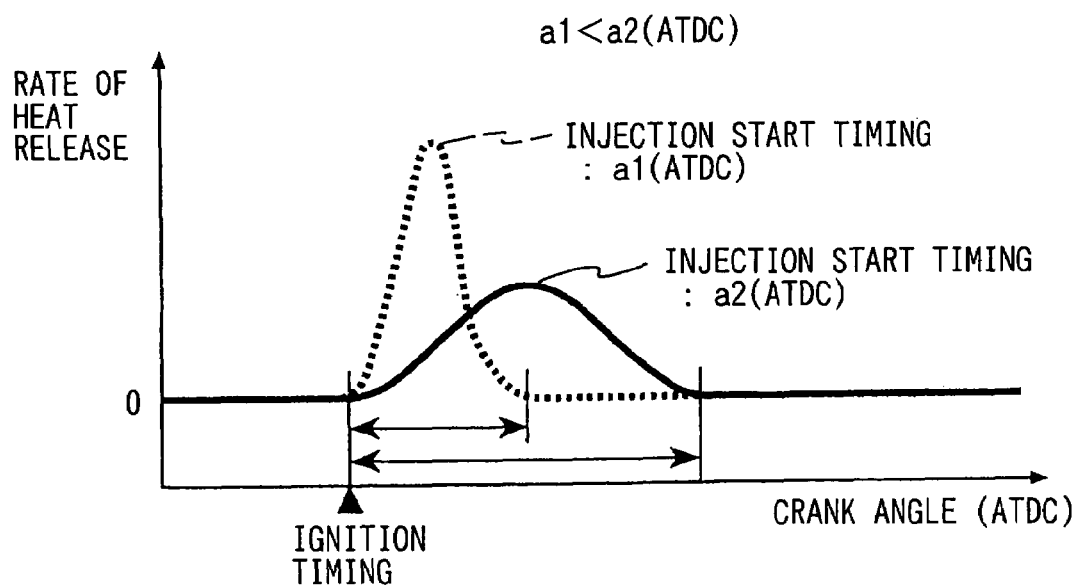
FIG. 5 is another graph showing an operation of the exhaust gas cleaning device of the embodiment.

FIG. 5 shows two combustion profiles, which are obtained at different fuel injection start timings (a1(ATDC)<a2 (ATDC)). At the retarded side fuel injection start timing (a2(ATDC)), which is retarded relative to the fuel injection start timing (a1(ATDC)), although a peak of a rate of heat release is made smaller, the combustion is prolonged. That is, the combustion is softened, and the end timing of the combustion is delayed. Thus, in the cases of the injection patterns B-2, B-3, the time interval (injection interval) between the end of the previous fuel injection and the start of the current fuel injection is progressively and sequentially increased in the third or latter injection stages, and the combustion is prolonged. At the final injection stage, the combustion is performed on the most retarded point to further increase the exhaust gas temperature. That is, when the number of the injection stages is increased, the combustion can be performed on the further retarded point to effectively increase the exhaust gas temperature. The injection patterns B-1 to B-3 differ from one another in the number of injection stages.

Figure 6A:
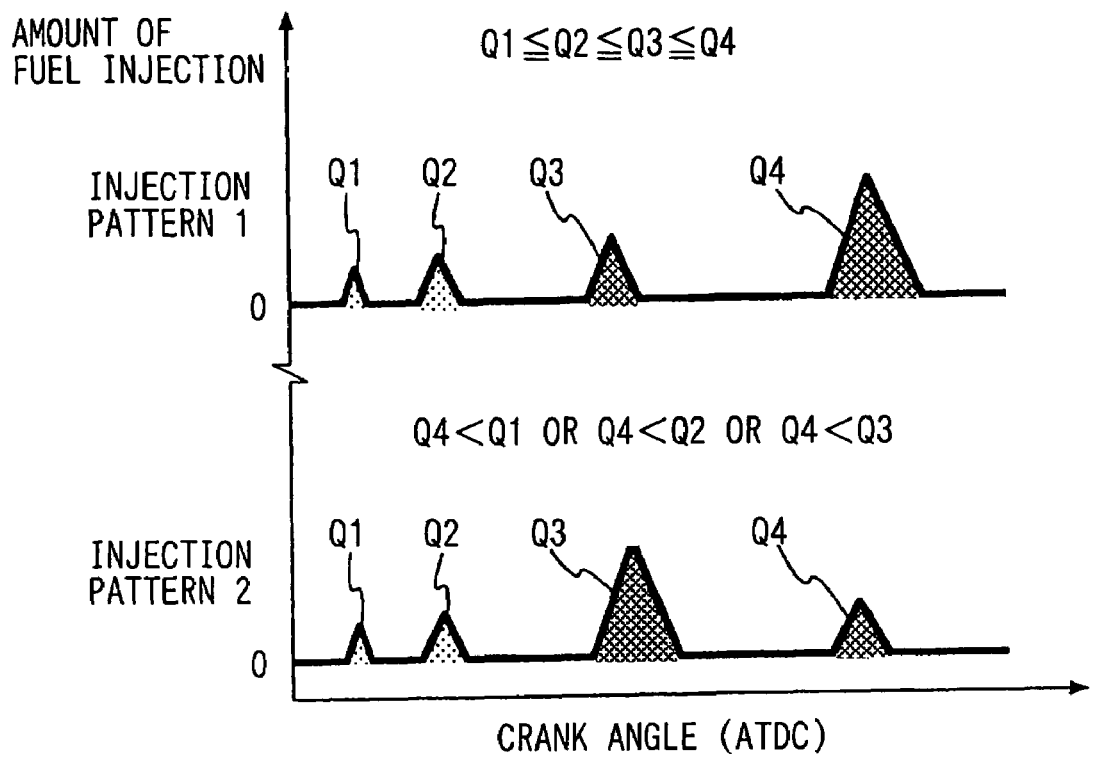
FIG. 6A is a timing chart for describing an operation of the exhaust gas cleaning device of the embodiment.
Figure 6B:
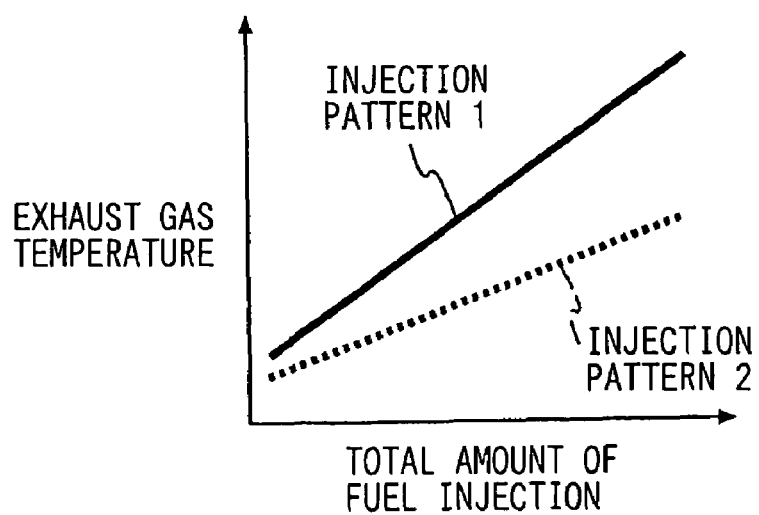
FIG. 6B is a graph showing an operation of the exhaust gas cleaning device of the embodiment.

In the injection pattern B, the amount of fuel injection is increased in the latter injection stages in comparison to the former injection stage. FIG. 6A shows two injection patterns, i.e., an injection pattern 1 and an injection pattern 2, each of which includes four injection stages. FIG. 6B shows a relationship between the total amount of fuel injection and the exhaust gas temperature. The injection pattern 1 corresponds to the injection pattern B. In the case of the injection pattern 1, when the amount of fuel injection in an nth injection stage (also referred to as an injection stage number n) is expressed by Qn, the following relationship should be established: $Q1 \leq Q2 \leq Q3 \leq Q4$. In the case of the injection pattern 2, $Q3>Q4$ or $Q2>Q4$ or $Q1>Q4$ should be satisfied. In the case of FIG. 6A, $Q3>Q4$ is satisfied. In both of the injection patterns 1, 2, in a case where the amount of fuel injection and the output power are kept the same, when the total amount of fuel injection per heat cycle is increased, the exhaust gas temperature is increased. However, the exhaust gas temperature of the injection pattern 1 is higher than the exhaust gas temperature of the injection pattern 2. That is, in the case of the injection pattern B, the amount of fuel injection is sequentially increased from the initial injection stage to the last injection stage to effectively increase the exhaust gas temperature.

Thus, the injection pattern B is selected when it is required to increase the exhaust gas temperature at the time of regenerating the DPF 41. Furthermore, a corresponding one of the injection patterns B-1 to B-3 is selected to achieve the appropriate injection, which corresponds to the current operational condition of the engine.

Figure 7:
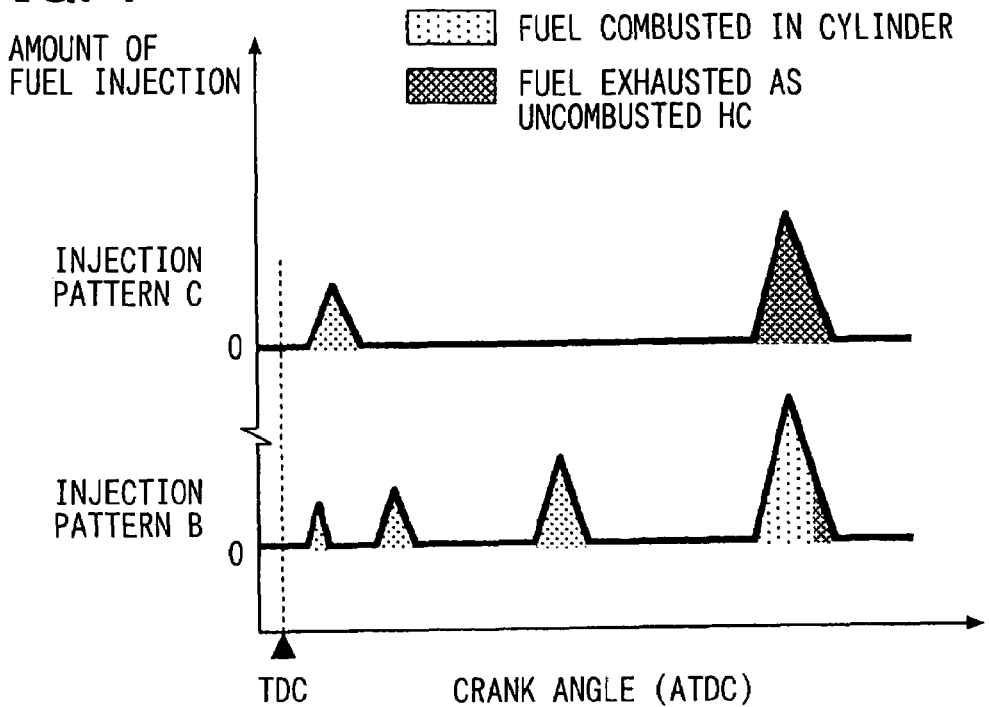
FIG. 7 is a timing chart for describing an operation of the exhaust gas cleaning device of the embodiment.

The injection pattern C is intended to supply uncombusted fuel to the DPF 41. Furthermore, the injection pattern C should be selected when it is required to increase the DPF temperature by supplying the uncombusted hydrocarbon (HC) at the time of DPF regeneration. FIG. 7 is a timing chart for comparing the injection pattern C and the injection pattern B. In the injection pattern C, the fuel injection in the second injection stage is performed after lapse of a sufficient interval from the fuel injection in the first injection stage, which is performed adjacent the compression TDC. Due to this injection interval, the majority of fuel, which is injected in the second injection stage, is discharged from the cylinder in the form of uncombusted HC.

Figure 8:
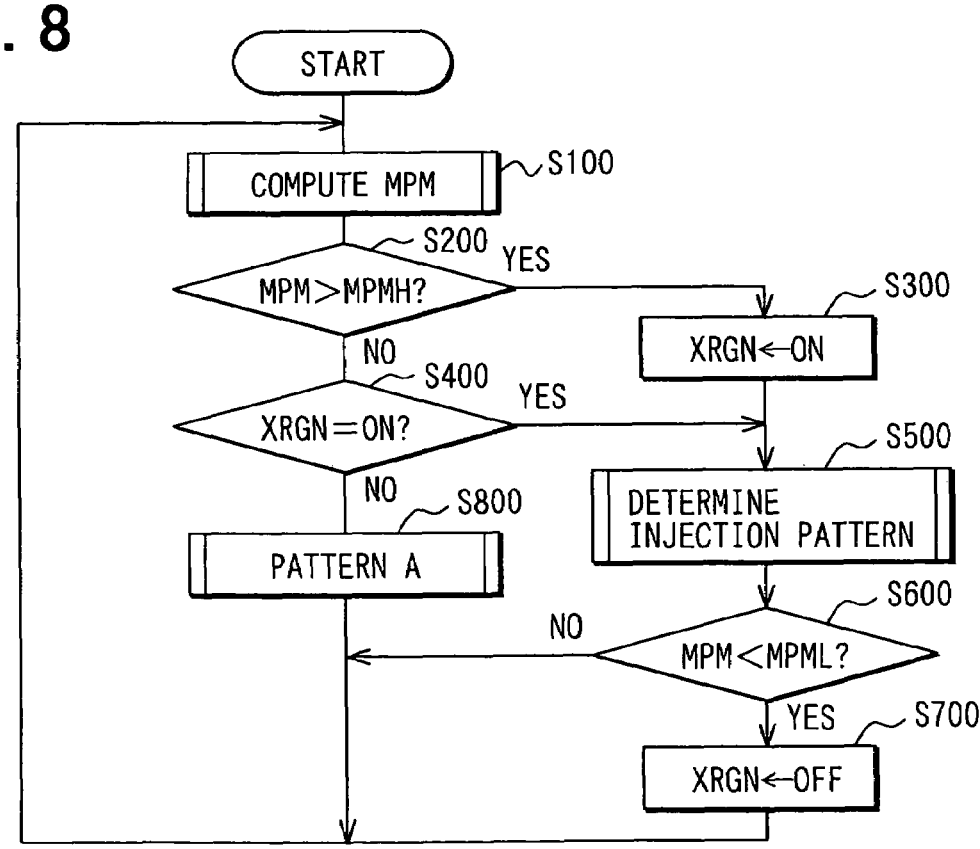
FIG. 8 is a flow chart showing a control operation executed in an ECU of the exhaust gas cleaning device of the embodiment.

FIG. 8 shows a control routine, which is executed by a microcomputer of the ECU 61. This routine is executed periodically by the ECU 61 at predetermined intervals. First, at step S100, the amount MPM of accumulated PM is computed. This computation is executed based on the pressure difference measured by the differential pressure sensor 55 between the upstream side and the downstream side of the DPF 41 and the amount of intake air measured by the air flow meter 51. Alternatively, the amount of discharged PM per unit time may be computed based on the operational condition of the engine 1, and the amount MPM of accumulated PM may be estimated based on a cumulative value, which is obtained by cumulation of the amounts of discharged PM per unit time.

At step S200, it is determined whether the current amount MPM of accumulated PM is greater than a start threshold amount MPMH of accumulated PM, which is a threshold value for starting the regeneration of the DPF 41. When the amount of PM, which is accumulated in the DPF 41, is relatively small like in the case of using a brand-new DPF 41, or when the regeneration of the DPF 41 has been just completed, NO is returned at step S200. When NO is returned at step S200, control proceeds to step S400. At step S400, it is determined whether a DPF regeneration flag XRGN is turned on, i.e., is set. The DPF regeneration flag XRGN is kept turned on from the beginning to the end of the regeneration operation of the DPF 41. When NO is returned at step S400, control proceeds to step S800. At step S800, the injection pattern A is set, and control returns to step S100.

When the accumulation of the PM in the DPF 41 progresses, and the current amount MPM of accumulated PM exceeds the start threshold amount MPMH of accumulated PM, YES is returned at step S200. Therefore, it is determined that the regeneration of the DPF 41 is required, and control proceeds to step S300. At step S300, the DPF regeneration flag XRGN is turned on, and control proceeds to step S500. At step S500, a temperature increasing period injection pattern, which is an injection pattern for increasing the temperature of the DPF 41, is determined, and the fuel injection is performed with the determined injection pattern.

At step S600, it is determined whether the current amount MPM of accumulated PM is less than an end threshold amount MPML of accumulated PM, which is a threshold value for termination of the regeneration of the DPF 41. The end threshold amount MPML of accumulated PM is set to be less than the start threshold amount MPMH of accumulated PM. NO will be returned for the inquiry at step S600 for a while after the start of the regeneration of the DPF 41. When NO is returned at step S600, control returns to step S100.

In step S200, which is executed after execution of step S100 upon returning of NO in step S600, when NO is returned, control proceeds to step S400. In this case, the DPF regeneration flag XRGN has been set to be turned on, so that YES is returned at step S400, and control proceeds to step S500 where the temperature increasing period injection pattern is determined.

Then, when the current amount MPM of accumulated PM becomes less than the end threshold amount MPML of accumulated PM (i.e., YES at step S600), it is determined that the regeneration of the DPF 41 should be terminated. Thus, control proceeds to step S700 where the DPF regeneration flag XRGN is turned off. In this way, NO is returned to the inquiry of step S400. Therefore, the injection patter A is selected at step S800, and therefore the temperature increasing period injection pattern will not be performed.

Next, the process of step S500 for determining the temperature increasing period injection pattern will be described with reference to FIG. 9. First, it should be noted that steps S501 to S509 serve as an injection pattern selecting means of the present invention. At step S501, the exhaust gas temperature THIN is read, i.e., is obtained. In the following step S502, it is determined whether the exhaust gas temperature THIN, which is sensed through the upstream side exhaust gas temperature sensor 53, is equal to or less than a first predetermined value, which serves as a reference exhaust gas temperature. The first predetermined value is set to be adjacent to the regenerative temperature of the DPF 41 (the temperature, which enables the regeneration of the DPF 41). When it is determined that the exhaust gas temperature THIN is less than the first predetermined value, and thereby YES is returned at step S502, one of the injection patterns B-1 to B-3 is selected through steps S504 to S509. This is to supply the temperature increased exhaust gas to the DPF 41 to increase the temperature of the DPF 41 while avoiding the poisoning of the catalyst of the DPF 41. When it is determined that the exhaust gas temperature THIN is equal to or greater than the first predetermined value, and thereby NO is returned at step S502, there is no possibility of poisoning the catalyst. Thus, control proceeds to step S503 where the injection pattern C is selected, and control proceeds to step S510. As discussed above, the injection pattern C provides the uncombusted HC to the DPF 41 by the fuel injection in the latter injection stage at the sufficiently retarded angle, which does not cause the combustion of the injected fuel.

Here, it should be noted that steps S504 to S509 serve as a total injection stage number setting means of the present invention. First, at step S504, the injection pattern B-2 is selected. Then, at step S505, the amount MHC of exhaust HC, which is the amount of uncombusted components (uncombusted exhaust component amount) exhausted from the engine 1, is computed based on the output signal of the A/F sensor 52 and the output signal of the air flow meter 51. The A/F sensor 52 and the air flow meter 51 constitute an uncombusted exhaust component amount sensing means of the present invention.

At step S506, it is determined whether the amount MHC of exhaust HC exceeds a second predetermined value. When YES is returned at step S506, it is determined that the uncombusted HC is excessive, so that control proceeds to step S507. At step S507, the injection pattern B-3, which includes one additional injection stage in comparison to the injection pattern B-2, is selected. Then, control proceeds to step S510. The injection pattern B-3 includes the greatest number of injection stages and implements the fuel injection at the most retarded angle, so that the exhaust gas temperature can be increased most effectively.

Figure 10A:
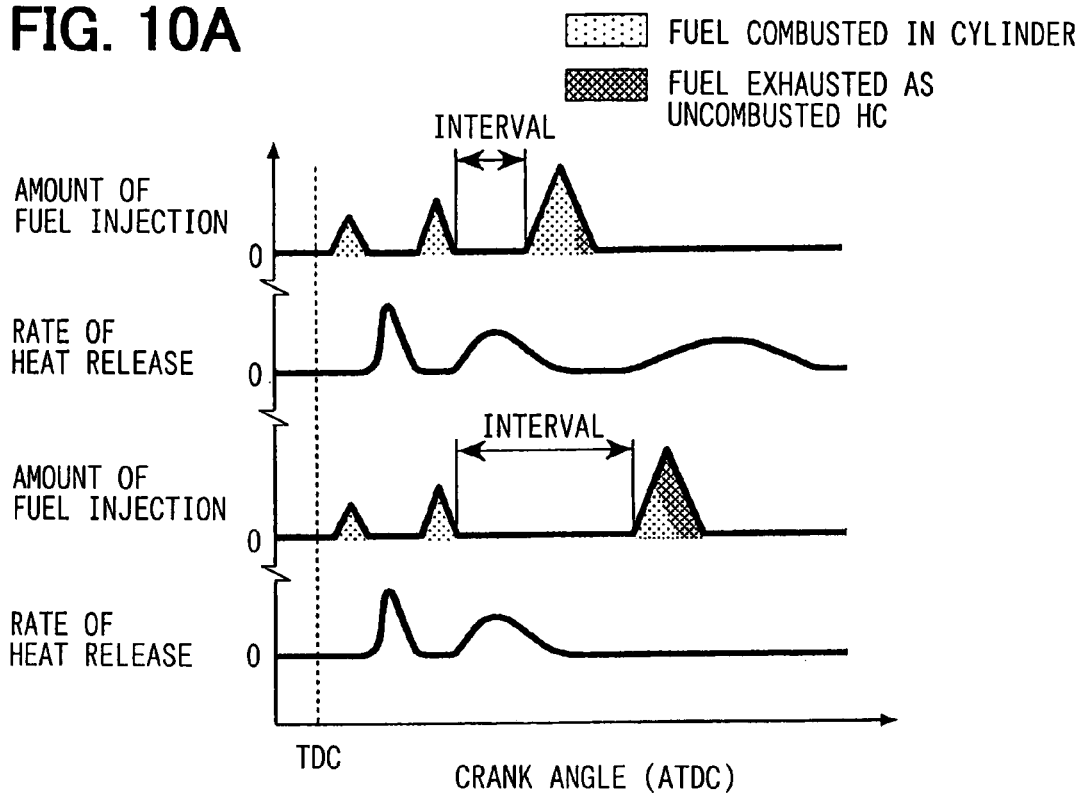
FIG. 10A is a timing chart for describing an operation of the exhaust gas cleaning device of the embodiment.
Figure 10B:
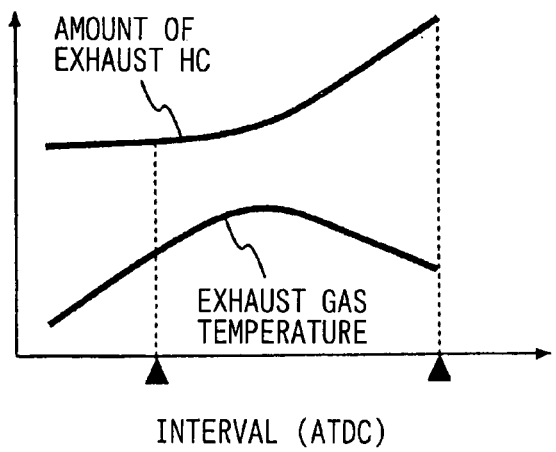
FIG. 10B is a graph for describing an operation of the exhaust gas cleaning device of the embodiment.

FIG. 10A shows three stage injection patterns, which differ from one another with respect to the injection interval of the last injection stage. FIG. 10B shows a relationship between the injection interval and the amount of exhaust HC and a relationship between the injection interval and the exhaust gas temperature. When the injection interval is increased, the fuel injection at the last injection stage is retarded, and thereby the exhaust gas temperature is increased. However, when the fuel injection is retarded, the possibility of the misfiring is increased. Therefore, when the fuel injection in the last injection stage is excessively retarded, the fuel injected in the last injection stage will not be combusted, thereby increasing the uncombusted exhaust HC. Furthermore, since the fuel is not combusted, the exhaust gas temperature is reduced.

Therefore, when the amount MHC of the exhaust HC exceeds the second predetermined value, it is determined that the limit for effectively increasing the exhaust gas temperature has been exceeded. Thus, the additional injection stage is provided to shift the misfiring limit to the further retarded side and thereby to limit the output of the uncombusted HC.

When NO is returned at step S506, control proceeds to step S508. At step S508, it is determined whether the amount of fuel injection in the last injection stage, which is located at the most retarded angle, is less than a third predetermined value. When YES is returned at step S508, the injection pattern B-1 is selected. The injection pattern B-1 has the smaller number of injection stages, which is one stage smaller than that of the injection pattern B-2. When NO is returned at step S508, the injection patter B-2, which has been selected at step S504, is maintained, and control proceeds to step S510.

As discussed above, the second predetermined value is made as the reference amount of exhaust HC to minimize the number of injection stages while limiting the amount MHC of exhaust HC. In this way, the appropriate number of injection stages is selected.

At step S510, it is determined whether the engine 1 is in an idling state. When YES is returned at step S510, control proceeds to steps S511 to S523 where an idling speed control (ISC) operation is performed to adjust the amount of fuel injection in the respective injection stages. When it is determined that the engine 1 is not in the idling state, control skips S511 to S523 and returns.

Here, steps S511-S515 serve as an engine power related injection amount setting means of the present invention. At step S511, the engine rotational speed (rpm) NE is read. Then, at step S512, a deviation ERRNE (=NE−NETRG) between the measured engine rotational speed NE and a target rotational speed NETRG, which is a target engine power, is computed. Then, at step S513, it is determined whether the deviation ERRNE is negative. When NO is returned at step S513, i.e., when the engine rotational speed NE is higher than the target rotational speed NETRG, control proceeds to step S514. At step S514, the amount of fuel injection in the former injection stage(s) is reduced, i.e., is decreased to reduce the engine power, and control proceeds to step S516. The reduction of the amount of fuel injection is set based on the deviation ERRNE in such a manner that the reduction gets larger when an absolute value of the deviation ERRNE is increased. In this case, a minimum amount of fuel injection, which is a minimum threshold amount, is set for each injection stage. Hereinafter, the minimum amount of fuel injection at the nth stage is expressed as the minimum amount n of fuel injection. Thus, starting from the first injection stage, the amount of fuel injection in the former injection stage(s) is reduced without falling below the minimum amount of fuel injection. More specifically, when the amount of fuel injection in the first injection stage is equal to or greater than the minimum amount 1 of fuel injection, the amount of fuel injection in the first injection stage is reduced. When the amount of fuel injection in the first injection stage becomes the minimum amount 1 of fuel injection, the amount of fuel injection in the second injection stage is reduced next without falling below the minimum amount 2 of fuel injection. As described above, the amount of fuel injection is reduced from the first injection stage to the following latter injection stage(s).

At the time of reducing the amount of fuel injection, the amount of fuel injection in each injection stage is limited to be equal to or greater than the minimum amount of fuel injection assigned to that particular injection stage. Thus, the amount of fuel injection is always maintained to be equal to or greater than the corresponding minimum amount of fuel injection.

When YES is returned at step S513, i.e., when the engine rotational speed NE is lower than the target rotational speed NETRG, the amount of fuel injection is increased at the former injection stage(s) at step S515 to increase the engine power. Then, control proceeds to step S516. The increase of the amount of fuel injection is set based on the deviation ERRNE in such a manner that the increase gets larger when an absolute value of the deviation ERRNE is increased. In this case, a maximum amount of fuel injection, which is an upper threshold value of the amount of fuel injection, is set for each injection stage. Hereinafter, the maximum amount of fuel injection at the nth stage is expressed as the maximum amount n of fuel injection. Thus, starting from the first injection stage, the amount of fuel injection in the former stage(s) is increased without exceeding the maximum amount of fuel injection. More specifically, when the amount of fuel injection in the first injection stage is equal to or less than the maximum amount 1 of fuel injection, the amount of fuel injection in the first injection stage is increased. When the amount of fuel injection in the first injection stage becomes the maximum amount 1 of fuel injection, the amount of fuel injection in the second injection stage is increased without exceeding the maximum amount 2 of fuel injection. As described above, the amount of fuel injection is increased from the first injection stage to the subsequent injection stage(s).

Here, it should be noted that steps S516 to S519 serve as an exhaust gas temperature related injection amount setting means of the present invention. At step S516, a deviation ERRTH (=THIN−THTRG) between the exhaust gas temperature THIN and the target exhaust gas temperature THTRG is computed. Then, at step S517, it is determined whether the deviation ERRTH is negative. When NO is returned at step S517, i.e., when the exhaust gas temperature THIN is higher than the target exhaust gas temperature THTRG, the control proceeds to step S518. At step S518, the amount of fuel injection in the latter stage(s) is reduced, i.e., is decreased. Then, control proceeds to step S520. The reduction of the amount of fuel injection is set based on the deviation ERRTH in such a manner that the reduction gets larger when an absolute value of the deviation ERRTH is increased. In this case, similar to step S514, a minimum amount of fuel injection, which is a lower threshold value of the amount of fuel injection, is set for each injection stage. Thus, starting from the last injection stage, the amount of fuel injection in the latter injection stage(s) is reduced without falling below the minimum amount of fuel injection. More specifically, first, when the amount of fuel injection in the last injection stage (n0th stage) is equal to or greater than the predetermined minimum amount n0 of fuel injection, the amount of fuel injection is reduced. Then, when the amount of fuel injection in the last injection stage becomes the minimum amount n0 of fuel injection, the amount of fuel injection in the previous injection stage (n0−1)th is reduced next without falling below the minimum amount (n0−1) of fuel injection in that particular injection stage. As described above, the amount of fuel injection is reduced from the last injection stage to the former injection stage(s).

When YES is returned at step S517, i.e., when the exhaust gas temperature THIN is lower than the target exhaust gas temperature THTRG, the amount of fuel injection is increased at the latter injection stage(s) at step S515 to increase the exhaust gas temperature. Then, control proceeds to step S516. The increase of the amount of fuel injection is set based on the deviation ERRTH in such a manner that the increase gets larger when an absolute value of the deviation ERRTH is increased. In this case, a maximum amount of fuel injection, which is an upper threshold value of the amount of fuel injection, is set for each injection stage. Starting from the last injection stage, the amount of fuel injection in the latter injection stage(s) is increased without exceeding the maximum amount of fuel injection. More specifically, first, when the amount of fuel injection in the last injection stage (n0th stage) is equal to or less than the predetermined maximum amount n0 of fuel injection, the amount of fuel injection is increased in the last injection stage. Then, when the amount of fuel injection in the last injection stage becomes the maximum amount n0 of fuel injection, the amount of fuel injection in the previous injection stage (n0−1)th is increased next without exceeding the maximum amount (n0−1) of fuel injection in that particular injection stage. As described above, the amount of fuel injection is increased from the latter injection stage to the former injection stage(s).

At the time of reducing the amount of fuel injection, the amount of fuel injection in each injection stage is limited to be equal to or greater than the minimum amount of fuel injection assigned to that particular injection stage. Thus, the amount of fuel injection is always maintained to be equal to or greater than the corresponding minimum amount of fuel injection.

Figure 11A:
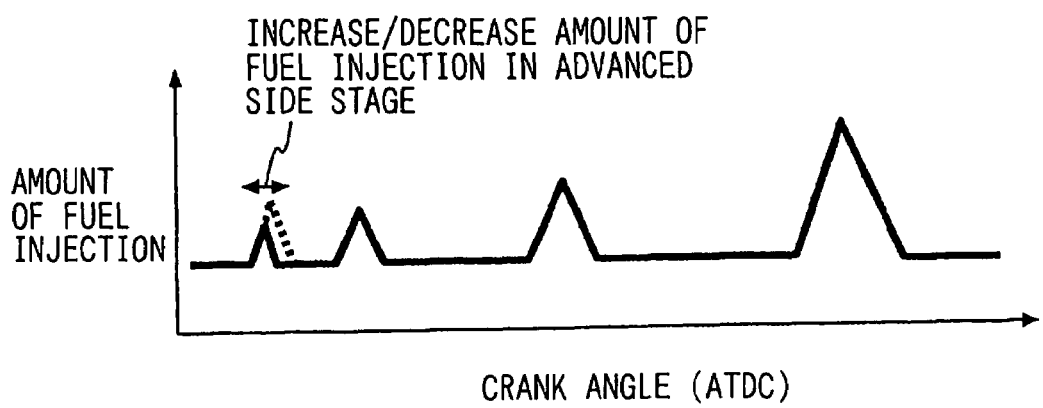
FIG. 11A is a timing chart for describing an operation of the exhaust gas cleaning device of the embodiment.
Figure 11B:
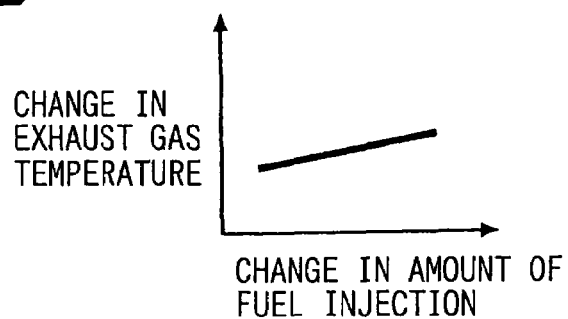
FIG. 11B is a graph for describing an operation of the exhaust gas cleaning device of the embodiment.
Figure 11C:
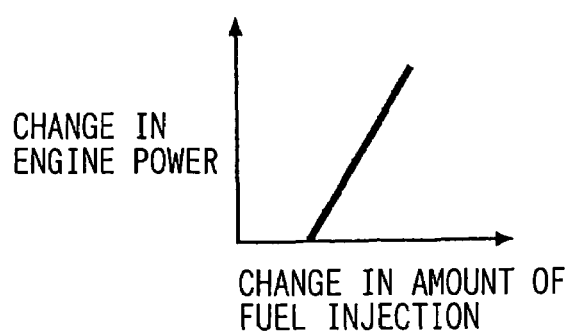
FIG. 11C is another graph for describing an operation of the exhaust gas cleaning device of the embodiment.
Figure 12A:
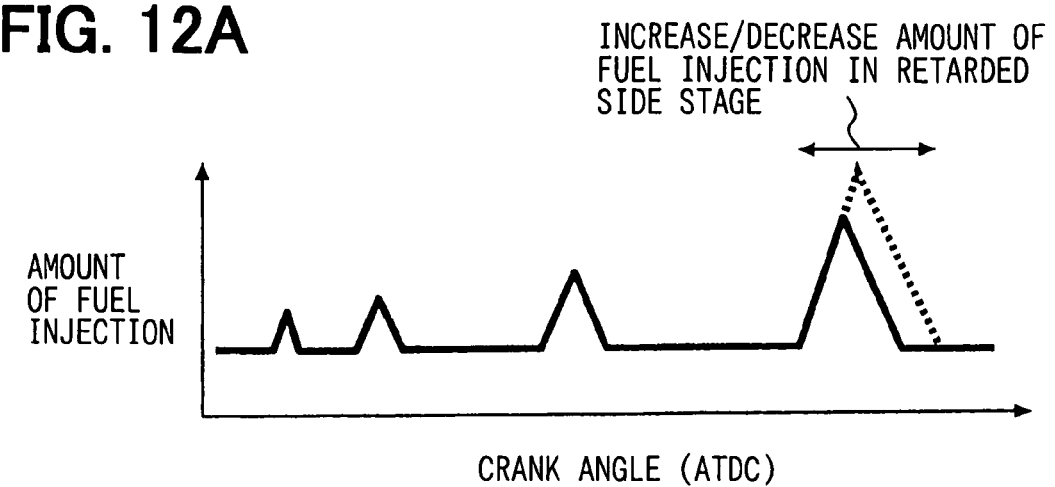
FIG. 12A is a timing chart for describing an operation of the exhaust gas cleaning device of the embodiment.
Figure 12B:
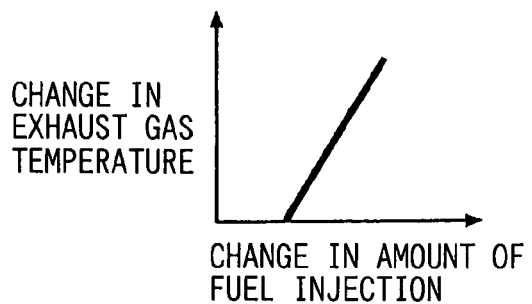
FIG. 12B is a graph for describing an operation of the exhaust gas cleaning device of the embodiment.
Figure 12C:
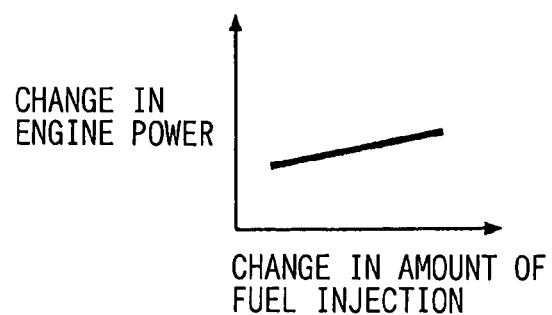
FIG. 12C is another graph for describing an operation of the exhaust gas cleaning device of the embodiment.

Now, with reference to FIGS. 11A-12C, there will be described differences between steps S513 to S515, which adjust the amount of fuel injection relative to the engine power proceeding from the first injection stage toward the latter injection stage(s), and the steps S517 to S519, which adjust the amount of fuel injection relative to the exhaust gas temperature proceeding from the last injection stage toward the former injection stage(s). FIGS. 11A to 11C show the case where the amount of fuel injection is increased or decreased in the injection pattern B in the former injection stage (the most advanced side injection stage). More specifically, FIG. 11A shows a change in the injection pattern at the time of increasing or decreasing the amount of fuel injection in the former injection stage (the advanced injection stage or the first injection stage). FIG. 11B shows a change in the exhaust gas temperature at the time of increasing or decreasing the amount of fuel injection in the former injection stage. FIG. 11C shows a change in the engine power at the time of increasing or decreasing the amount of fuel injection in the former injection stage. FIGS. 12A to 12C show the case where the amount of fuel injection is increased or decreased in the injection pattern B in the latter injection stage (the most retarded side injection stage). More specifically, FIG. 12A shows a change in the injection pattern at the time of increasing or decreasing the amount of fuel injection in the latter injection stage. FIG. 12B shows a change in the exhaust gas temperature at the time of increasing or decreasing the amount of fuel injection in the latter injection stage. FIG. 12C shows a change in the engine power at the time of increasing or decreasing the amount of fuel injection in the latter injection stage.

As clearly understood from the drawings, in the case where the amount of fuel injection is increased or decreased in the former injection stage, although the change in the exhaust gas temperature is relatively small, the change in the engine power is relatively large. In contrast, in the case where the amount of fuel injection is increased or decreased in the latter injection stage, although the change in the exhaust gas temperature is relatively large, the change in the engine power is relatively small. This is due to the following reasons. That is, in the former injection stage where the injection timing is in the advanced side, the energy, which is generated by combustion of fuel, is effectively converted into the engine power. In contrast, in the latter injection stage where the injection timing is in the retarded side, the energy, which is generated by combustion of fuel, is not effectively converted into the engine power and is therefore outputted as the waste heat. As described above, the exhaust gas temperature and the engine power show reversed results between the time of increasing or decreasing the amount of fuel injection in the former injection stage and the time of increasing or decreasing the amount of fuel injection in the latter injection stage. Thus, in the case of adjusting the engine power, the adjustment of the amount of fuel injection proceeds from the former injection stage toward the latter injection stage, so that the engine power can be adjusted without causing the substantial influence on the exhaust gas temperature. Furthermore, in the case of adjusting the exhaust gas temperature, the adjustment of the amount of fuel injection proceeds from the latter injection stage toward the former injection stage, so that the exhaust gas temperature can be adjusted without causing the substantial influence on the engine power.

Steps S520 to S523 serve as an injection amount correcting means of the present invention. At step S520, a cumulative value IENE of the deviations ERRNE of the engine rotational speed is computed. This computation is performed as follows. That is, the current deviation ERRNE (i) is added to the previous cumulative value IENE (i−1) to obtain the current cumulative value IENE(i). Then, at step S521, it is determined whether the cumulative value IENE is negative. When NO is returned at step S521, that is, when the engine power is excessive (i.e., above the threshold power), the amount of fuel injection in the former injection stage(s) is reduced, i.e., is decreasingly corrected at step S522, and control proceeds to return. The reduction of the amount of fuel injection is set based on the cumulative value IENE in such a manner that the reduction gets larger when an absolute value of the cumulative value IENE is increased. Similar to step S514, the reduction of the amount of fuel injection is performed proceeding from the former injection stage toward the latter injection stage (e.g., from the first injection stage toward the last injection stage). When the amount of fuel injection is reduced sequentially proceeding from the former injection stage, the excessive engine power, which is caused by, for example, the variations (e.g., manufacturing variations) in the engines, can be corrected without substantially reducing the exhaust gas temperature.

Furthermore, when YES is returned at step S521, that is, when the engine power is short, control proceeds to step S523. At step S523, the amount of fuel injection is increased, i.e., is increasingly corrected starting from the latter injection stage(s), and control proceeds to return. The increase of the amount of fuel injection is set based on the cumulative value IENE in such a manner that the increase gets larger when an absolute value of the cumulative value IENE is increased. Similar to step S519, the increase of the amount of fuel injection is performed proceeding from the latter injection stage toward the former injection stage (e.g., from the last injection stage toward the first injection stage). When the amount of fuel injection is sequentially increased proceeding from the latter injection stage, shortage of the engine power, which is caused by, for example, variations in the engines, can be corrected while achieving the high exhaust gas temperature.

Figure 13:
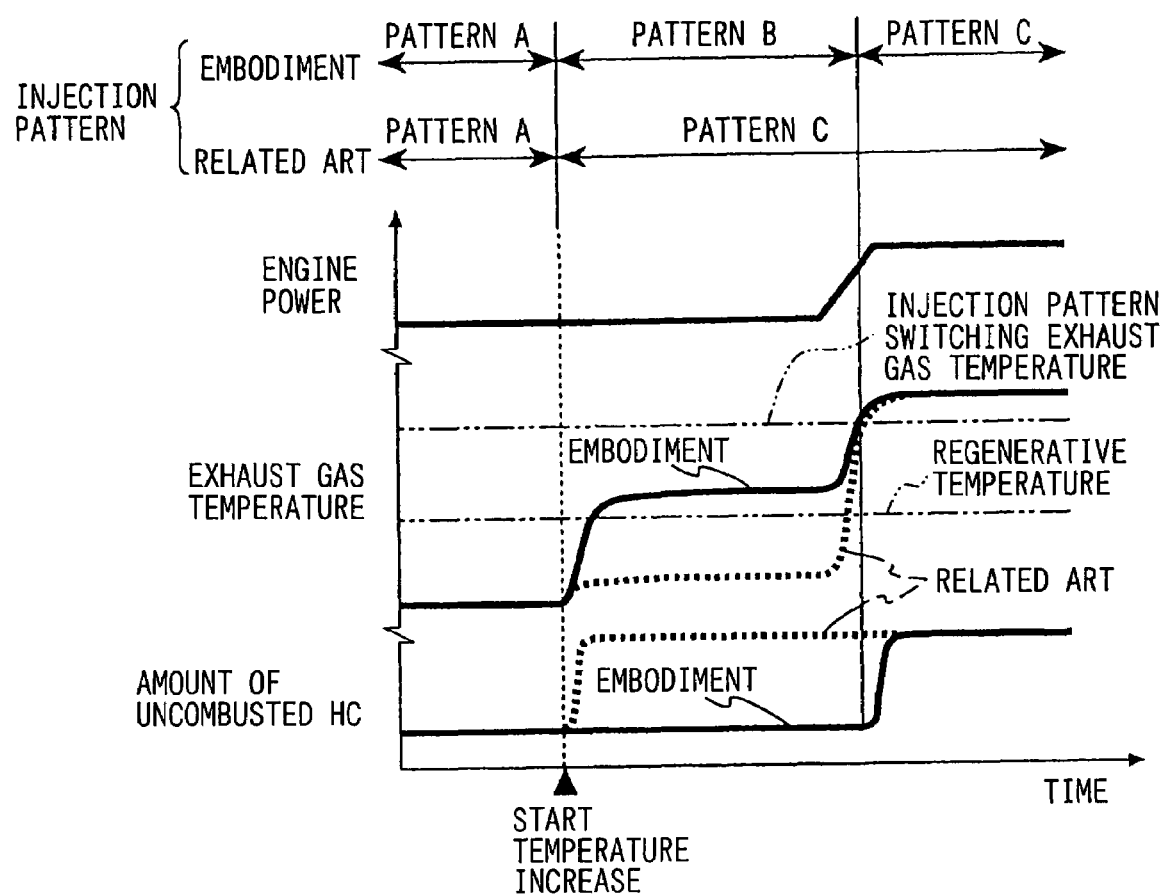
FIG. 13 is a timing chart for describing an operation of the exhaust gas cleaning device of the embodiment.

FIG. 13 is a diagram, in which the present embodiment is compared with the previously proposed technique (related art technique). In the previously proposed technique, the injection pattern is shifted from the normal injection pattern (corresponding to the injection pattern A of the present embodiment) to the other injection pattern for increasing the DPF temperature by supplying the uncombusted HC to the DPF 41 (corresponding to the injection pattern C of the present embodiment). In the previously proposed technique, when the engine power is relatively small, the exhaust gas temperature cannot be substantially increased. Furthermore, in the previously proposed technique, even when the uncombusted HC is supplied to the DPF 41, the temperature of the DPF 41 cannot be sufficiently increased. In the present embodiment, the injection pattern B is selectable. Thus, the exhaust gas temperature can be quickly increased by selecting the injection pattern B in advance of executing the injection pattern C, which provides the uncombusted HC. In this way, the temperature of the DPF 41 exceeds the regenerative temperature of the DPF 41. Therefore, it is possible to provide the favorable environment for combusting the uncombusted HC in the DPF 41.

In the case where the injection patterns B, C are selected, by adjusting the injection interval of the last injection stage, it is possible to optimize the ratio between the amount of a portion of the injected fuel, which is converted into the exhaust heat, and the amount of another portion of the injected fuel, which becomes the uncombusted fuel. For example, in the case of the injection pattern B, when the exhaust gas temperature is made equal to or greater than the predetermined temperature to accelerate the activation of the catalyst in the front end of the DPF 41, the combustion heat is not converted beyond the required amount. Thus, there exists the best ratio of the corresponding portion of the injected fuel, which is converted into the exhaust heat and achieves the best amount of exhaust heat. Furthermore, in the case of the injection pattern C, the energy loss, which is caused by heat release from the exhaust gas passage 22, is minimized, and the catalyst at the front end of the DPF 41 can get the required exhaust gas temperature, which is required to maintain the minimum level of the activation. Thus, in the case of the injection pattern C, there exists the ratio for achieving the best exhaust heat. The best ratios of the injection patterns B, C vary based on the operational states (e.g., the engine rotational speed and the required torque). The fuel injection timing is adjusted to achieve the best ratio in advance. However, the actual ratio deviates from the best ratio due to the variations (e.g., manufacturing variations) in the injectors or the variations in the ignitability.

The actual ratio is adjusted based on the relationship between the injection interval and the exhaust gas temperature and the amount of exhaust HC shown in FIG. 10B. In the injection pattern B, the injection interval is sufficiently retarded without causing misfiring to increase the ratio of the waste heat. However, in the case where the desired combustion heat cannot be obtained due to the excessive retardation of the fuel injection, the injection interval is shortened to increase the ratio of the corresponding portion of the injected fuel, which is converted into the exhaust heat. In the injection pattern C, the injection interval is sufficiently lengthened to output the uncombusted HC. However, when the desired amount of exhaust HC cannot be obtained, the injection interval should be further lengthened to increase the amount of exhaust HC.

Figure 14:
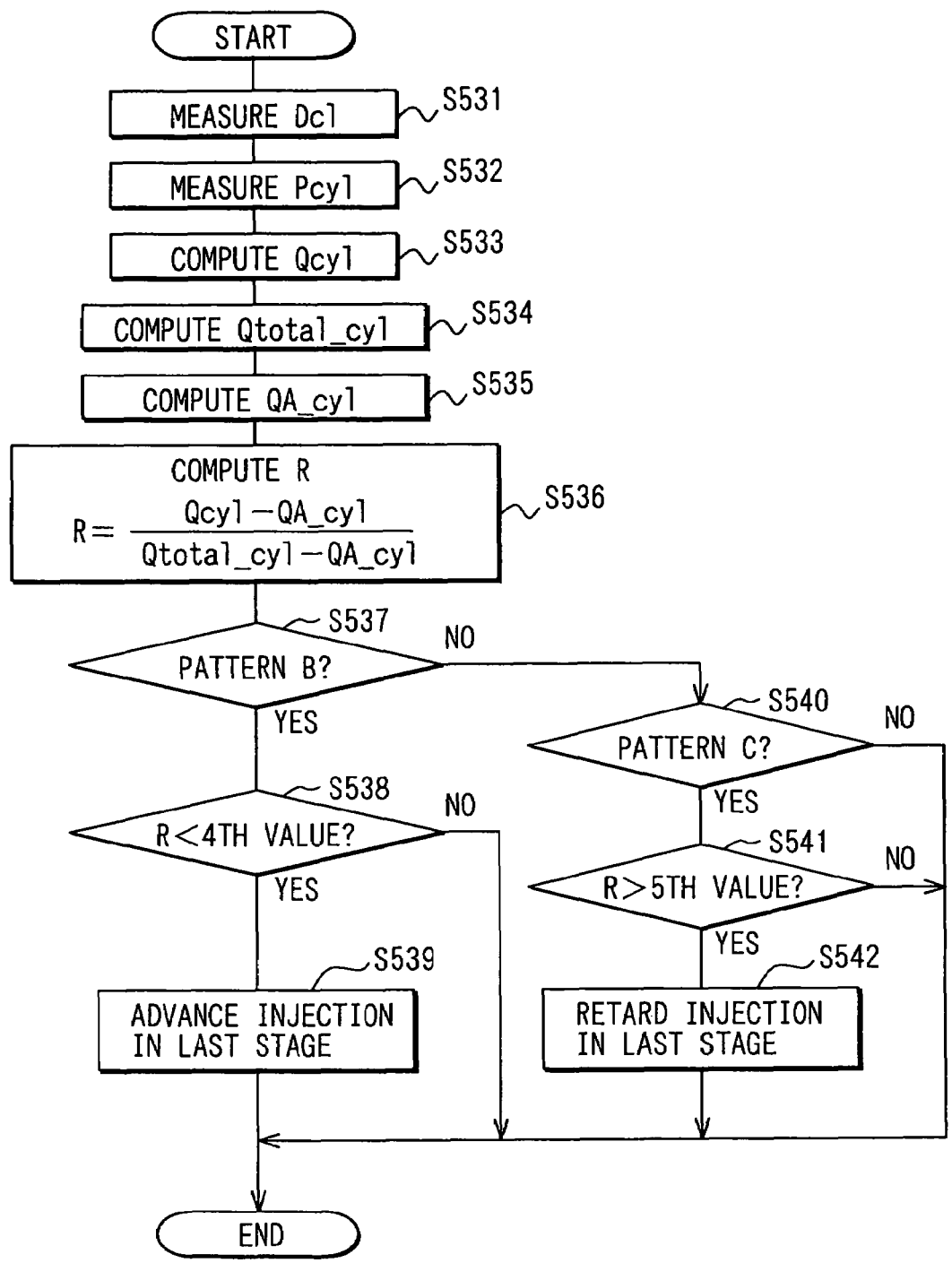
FIG. 14 is a flow chart showing a control operation executed in the ECU of the exhaust gas cleaning device.
Figure 15:
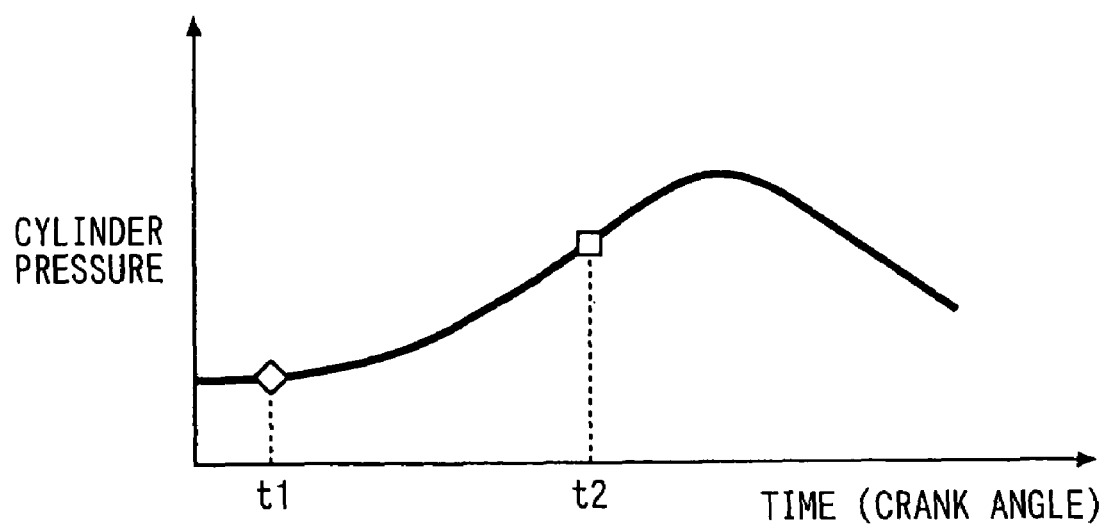
FIG. 15 is a graph showing a relationship between a cylinder pressure and a crank angle of the internal combustion engine.
Figure 16:
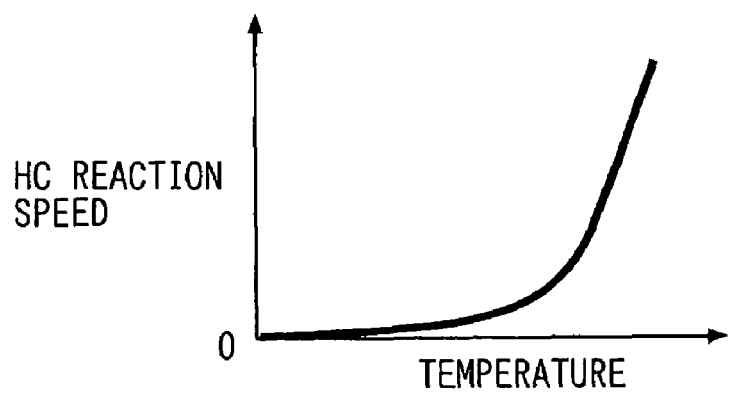
FIG. 16 is a graph showing a relationship between an HC reaction speed and the temperature in an oxidation catalyst.
Figure 17:
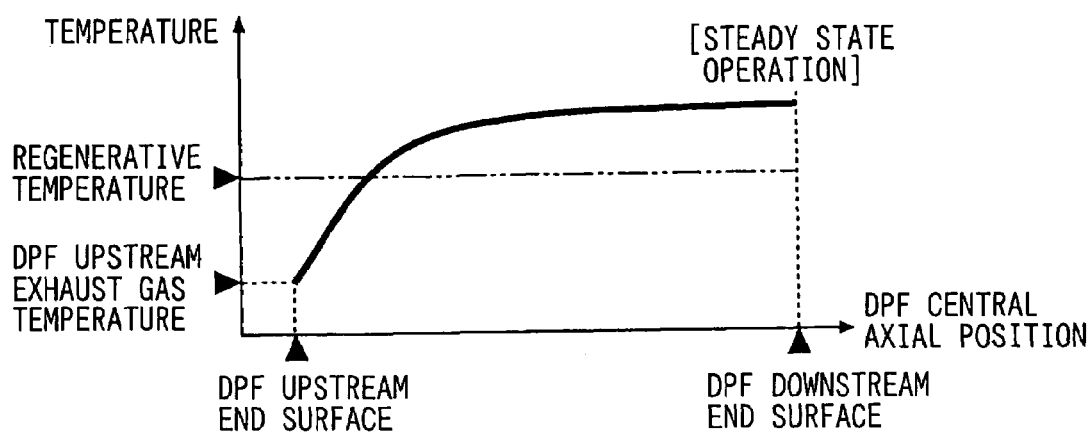
FIG. 17 is a graph for describing a previously proposed exhaust gas cleaning device for an internal combustion engine.
Figure 18:
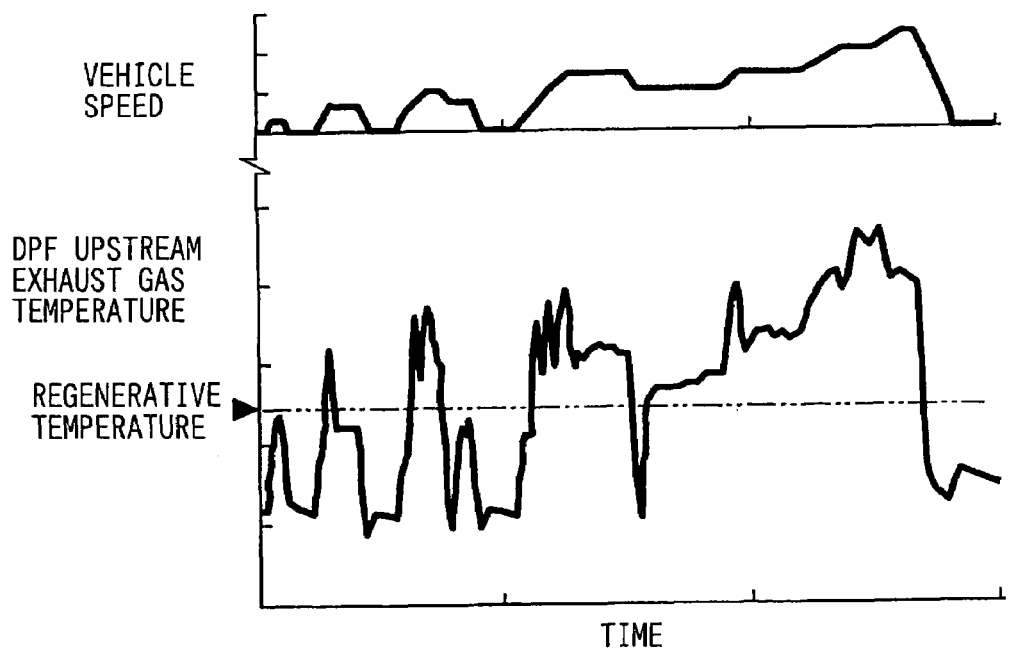
FIG. 18 is a timing chart for describing the previously proposed exhaust gas cleaning device.

FIG. 14 shows a control flow chart for adjusting the injection interval. The actual ratio can be known by computing the amount of generated heat in the actual cylinder. Thus, a cylinder pressure sensor is provided in each cylinder of the engine 1 to measure the pressure in the combustion chamber of the cylinder. Also, an engine rotational angle sensor is arranged adjacent a crankshaft to measure a crank rotational angle. First at step S531, the crank angle Dcl is measured with the engine rotational angle sensor. Then, at step S532, the cylinder pressure Pcl of the injection cylinder is measured with the cylinder pressure sensor. FIG. 15 shows a waveform, which indicates a change in the actual cylinder pressure measured with the cylinder sensor. In FIG. 15, an axis of abscissas indicates the crank angle. Furthermore, in FIG. 15, "t1" indicates the compression dead top center (DTC). Upon start of the compression stroke, the cylinder pressure increases by the compression, which is induced by the movement of the piston in the cylinder, and fuel combustion in the cylinder.

The energy of the gas present in the cylinder at a certain time t2 in the combustion period is expressed by a product PcylV of the cylinder pressure Pcyl and the cylinder volume V. The cylinder volume V is determined by the crank angle Dcl. This energy is a sum of the energy, which is generated by the compression, and the energy, which is generated by the combustion. When the energy, which is generated by the combustion, is expressed using a gas state equation, the heat value of the combustion can be obtained based on a change in the energy per unit crank angle. That is, when the cylinder pressure Pcyl per crank angle Dcl is measured, the amount Qcyl of heat generated in the cylinder per combustion cycle can be computed based on the measured cylinder pressure Pcyl at step S533.

The steps S534 to S536 serve as a ratio sensing means of the present invention. At step S534, in the selected injection pattern B or C, based on the total amount Qtotal of fuel injected in the single cylinder, the amount Qtotal_cyl of generated heat at the time of complete combustion of this injected fuel is computed. Next, at step S535, based on the total amount QA of fuel injection, which corresponds to the injection pattern A, the amount QA_cyl of generated heat at the time of complete combustion of this injected fuel is computed. The amount of fuel injection in the injection pattern B or C is a sum of the amount of fuel injection for achieving the power, which is substantially the same as that of the injection pattern A, and the amount of fuel injection for increasing the exhaust gas temperature or for supplying of the uncombusted fuel. Thus, before proceeding to step S536, the amount of heat, which corresponds to that of the injection pattern A, is obtained.

At step S536, a heat generating ratio R of the injection pattern B or C is computed based on the amount Qcyl of heat generated in the cylinder, which is computed at step S533, and the amount Qtotal_cyl of generated heat, which is computed at step S534, and the amount QA_cyl of generated heat, which is computed at step S535, as follows:

$$R = (Qcyl - QA\_cyl)/(Qtotal\_cyl - QA\_cyl)$$

where, (Qcyl-QA_cyl) indicates the heat value in the case where the amount of fuel injection, which corresponds to the selected injection pattern B or C, is completely combusted, and (Qtotal_cyl-QA_cyl) indicates the heat value of the portion of this amount of fuel, which is combusted to generate the exhaust heat.

Steps S537 to S542 serve as a correcting means of the present invention. At step S537, it is determined whether the selected injection pattern is the injection pattern B. When YES is returned at step S537, control proceeds to step S538. At step S538, it is determined whether the heat generating ratio R computed at step S536 is smaller than a fourth predetermined value. The fourth predetermined value is set to achieve the desired exhaust heat at the time of fuel injection at the injection pattern B. Ideally, the map values should be recorded or stored for the respective operational conditions (e.g., the engine rotational speed, the required torque) since the best value differs from one operational condition to another operational condition.

When YES is returned at step S538, it is determined that the amount of generated heat is smaller than the required amount of heat, and control proceeds to step S539 to increase the amount of exhaust heat. At step S539, the fuel injection in the injection pattern B in the last injection stage is advanced. In this way, the injection interval is reduced, and the output of the uncombusted fuel, which is caused by the misfiring, is reduced. Therefore, the ratio of the corresponding portion of the injected fuel, which is converted into the exhaust heat, is increased. At this time, the correction amount should be set in such a manner that the injection interval is reduced as the deviation between the computed ratio and the fourth predetermined value gets larger. When NO is returned at step S538, it is determined that the amount of generated heat is equal to or greater than the required amount of heat, and the current process is terminated.

At step S537, when it is determined that the selected injection pattern is not the injection pattern B, control proceeds to step S540. At step S540, it is determined whether the selected injection pattern is the injection pattern C. When YES is returned at step S540, control proceeds to step S541. At step S541, it is determined whether the heat generating ratio R, which is computed at step S536, is greater than a fifth predetermined value. The fifth predetermined value is set to achieve the desired amount of exhaust HC at the time of fuel injection at the injection pattern C. Ideally, the map values should be recorded or stored for the respective operational conditions (e.g., the engine rotational speed, the required torque) since the best value differs from one operational condition to another operational condition.

When YES is returned at step S541, it is determined that the amount of exhaust HC is equal to or less than the required amount, and control proceeds to step S542 to increase the amount of exhaust HC. At step S542, the fuel injection at the injection pattern C in the last injection stage is retarded. In this way, the injection interval is increased, and the output of the uncombusted fuel, which is outputted without being combusted, is increased. Therefore, the ratio of the corresponding portion of the injected fuel, which is converted into the exhaust heat, is reduced. At this time, the correction amount should be set in such a manner that the injection interval is increased as the deviation between the computed ratio and the fifth predetermined value gets larger. When NO is returned at step S540 or step S541, the current process is terminated.

Through the present process, the ratio between the amount of the portion of the injected fuel, which is converted into the exhaust heat, and the amount of the other portion of the injected fuel, which becomes the uncombusted fuel, is adjusted by adjusting the injection interval to correct the manufacturing variations of the injectors and/or the variations in the ignitability of the injectors.

During the regeneration of the DPF 41 of the present embodiment, the injection pattern B or the injection pattern C is selected. However, in some operating ranges (e.g., the high load operating range) of the engine, the exhaust gas temperature is sufficiently high, so that it is not required to further increase the exhaust gas temperature or to supply the uncombusted HC. In such a case, in addition to the injection patterns B, C, the injection pattern A may be selected.

Furthermore, in the above embodiment, one of the three injection patterns (B-1 to B-3) is selectable as the injection pattern B. However, the present invention is not limited to this. That is, the injection pattern B may be selected from more than or less than the three injection patterns, i.e., the number of selectable injection patterns of the injection pattern B may be more than or less than three. For example, the number of selectable injection pattern(s) of the injection pattern B may be set to one.

Furthermore, in the above embodiment, the activation level of the catalyst of the DPF 41 is determined based on the temperature of the exhaust gas, which is exhausted from the engine 1 and is regarded as the temperature of the DPF 41. Alternatively, the activation level of the catalyst of the DPF 41 may be determined also based on the measured temperature of the downstream side exhaust gas temperature sensor 54, which measures the exhaust gas temperature on the downstream side of the DPF 41. Furthermore, the temperature of the DPF 41 may be estimated based on the exhaust gas temperature through use of a predetermined transfer function.

In the above embodiment, the amount of exhaust HC is obtained based on the output of the A/F sensor 52 and the output of the air flow meter 51. However, the present invention is not limited to this. For example, the amount of exhaust HC can be estimated based on the operational condition (e.g., the displacement volume, the exhaust gas temperature, the EGR rate) of the engine. Further alternatively, a cylinder pressure sensor may be provided, and the rate of heat release in the cylinder may be estimated based on the measured cylinder pressure. Then, the amount of exhaust HC may be estimated based on the rate of heat release of the cylinder and the amount of fuel injection. Alternatively, the temperature, which is increased by the catalyst reaction heat of the uncombusted HC in the DPF 41, may be measured based on a temperature difference between the measure temperature of the upstream side exhaust gas temperature sensor 53, which is located on the upstream side of the DPF 41, and the measured temperature of the downstream side exhaust gas temperature sensor 54, which is located on the downstream side of the DPF 41. The amount of exhaust uncombusted HC may be obtained based on this temperature difference.

Additional advantages and modifications will readily occur to those skilled in the art. The invention in its broader terms is therefore not limited to the specific details, representative apparatus, and illustrative examples shown and described.

What is claimed is:

1. An exhaust gas cleaning device for an internal combustion engine, the exhaust gas cleaning device comprising:
   a particulate filter that includes a filter substrate, which holds catalyst thereon for combusting and removing particulate matter through use of reaction heat of oxidation reaction of the catalyst to regenerate the particulate filter upon capturing of the particulate matter of exhaust gas exhausted from the internal combustion engine;
   a catalyst activation level sensing means for sensing an activation level of the catalyst; and
   an injection pattern selecting means for selecting one of first to third injection patterns, wherein:
   the first injection pattern is for performing a single fuel injection per heat cycle of the internal combustion engine and is for mainly generating an output power of the internal combustion engine;
   the second injection pattern is for performing multiple fuel injections in multiple injection stages, respectively, per heat cycle of the internal combustion engine;
   a first one of the multiple fuel injections of the second injection pattern is substantially the same as the fuel injection of the first injection pattern;
   the multiple fuel injections of the second injection pattern further include, per heat cycle, multiple subsequent fuel injections, which are performed on a retarded side of the first one of the multiple fuel injections of the second injection pattern and has a higher ratio of waste heat in comparison to that of the first one of the multiple fuel injections due to combustion of fuel injected by the multiple subsequent fuel injections, so that a temperature of the exhaust gas outputted from the internal combustion engine is increased, and a desired output power of the internal combustion engine is generated with the second injection pattern;
   the third injection pattern is for performing multiple fuel injections in multiple injection stages, respectively, per heat cycle of the internal combustion engine;
   a first one of the multiple fuel injections of the third injection pattern is substantially the same as the fuel injection of the first injection pattern;
   the multiple fuel injections of the third injection pattern further include at least one subsequent fuel injection, which is performed on a retarded side of the first one of the multiple fuel injections of the third injection pattern;
   an injection interval between an end point of the first one of the multiple fuel injections of the third injection pattern and a start point of a subsequent one of the at least one subsequent fuel injection of the third injection pattern is greater than that of the second injection pattern, so that a ratio of uncombusted fuel component of the exhaust gas generated upon combustion of fuel of the subsequent one of the at least one subsequent fuel injection in the third injection pattern becomes higher than that of the second injection pattern, and the thus generated uncombusted fuel component is supplied to the particulate filter, and the desired output power of the internal combustion engine is generated with the third injection pattern;
   the injection pattern selecting means selects one of the second and third injection patterns upon receiving a request for regenerating the particulate filter; and
   the injection pattern selecting means selects the second injection pattern when the activation level of the catalyst, which is sensed by the catalyst activation level sensing means, is relatively low and thereby is equal to or less than a threshold value.

2. The exhaust gas cleaning device according to claim 1, wherein:
   the catalyst activation level sensing means includes an exhaust gas temperature sensing means for sensing the temperature of the exhaust gas; and
   when the temperature of the exhaust gas, which is sensed by the exhaust gas temperature sensing means, is equal to or less than a reference exhaust gas temperature, it is determined that the activation level of the catalyst is relatively low, so that the injection pattern selecting means selects the second injection pattern.

3. The exhaust gas cleaning device according to claim 1, wherein;
   injection intervals of the multiple subsequent fuel injections of the second injection pattern are increased one after another toward a last one of the multiple subsequent fuel injections of the second injection pattern.

4. The exhaust gas cleaning device according to claim 1, wherein the amounts of fuel injections of the multiple fuel injections of the second injection pattern are increased one after another toward a last one of the multiple fuel injections of the second injection pattern.

5. The exhaust gas cleaning device according to claim 1, further comprising:
   an engine power sensing means for sensing the output power of the internal combustion engine; and
   an engine power related injection amount setting means for setting the amount of fuel injection in each of the multiple fuel injections of the second injection pattern without falling below a minimum threshold amount assigned to each of the multiple fuel injections of the second injection pattern in a manner that coincides the sensed output power of the internal combustion engine with a target output power of the internal combustion engine in a case where the second injection pattern is selected by the injection pattern selecting means, wherein the engine power related injection amount setting means sets the amount of fuel injection in each of the multiple fuel injections of the second injection pattern sequentially by starting from the first one of the multiple fuel injections toward a last one of the multiple fuel injections.

6. The exhaust gas cleaning device according to claim 5, wherein the engine power related injection amount setting means includes a correcting means for setting a correction amount for correcting the amount of fuel injection in each of the multiple fuel injections of the second injection pattern based on a deviation between the sensed output power of the internal combustion engine and the target output power of the internal combustion engine.

7. The exhaust gas cleaning device according to claim 1, further comprising:
an exhaust gas temperature sensing means for sensing the temperature of the exhaust gas; and
an exhaust gas temperature related injection amount setting means for setting the amount of fuel injection in each of the multiple fuel injections of the second injection pattern without falling below a minimum threshold amount assigned to each of the multiple fuel injections of the second injection pattern in a manner that coincides the sensed temperature of the exhaust gas with a target exhaust gas temperature in a case where the second injection pattern is selected by the injection pattern selecting means, wherein the exhaust gas temperature related injection amount setting means sets the amount of fuel injection in each of the multiple fuel injections of the second injection pattern sequentially by starting from the first one of the multiple fuel injections toward a last one of the multiple fuel injections.

8. The exhaust gas cleaning device according to claim 7, wherein the exhaust gas temperature related injection amount setting means includes a correcting means for setting a correction amount for correcting the amount of fuel injection in each of the multiple fuel injections of the second injection pattern based on a deviation between the sensed temperature of the exhaust gas and the target exhaust gas temperature.

9. The exhaust gas cleaning device according to claim 1, further comprising:
an uncombusted exhaust component amount sensing means for sensing the amount of uncombusted component exhausted from the internal combustion engine; and
a total injection stage number setting means for setting a total number of the injection stages of the second injection pattern based on the sensed amount of uncombusted component when the second injection pattern is selected by the injection pattern selecting means.

10. The exhaust gas cleaning device according to claim 1, further comprising:
an engine power sensing means for sensing the output power of the internal combustion engine; and
an injection amount correcting means for increasingly correcting the amount of fuel injection in each of the multiple fuel injections of the second injection pattern without exceeding above a maximum threshold amount assigned to that particular fuel injection of the second injection pattern in a case where the second injection pattern is selected by the injection pattern selecting means when the sensed output power of the internal combustion engine is short relative to a target output power of the internal combustion engine, wherein the injection amount correcting means sets a correction amount for correcting the amount of fuel injection in each of the multiple fuel injections of the second injection pattern sequentially by starting from a last one of the multiple fuel injections toward the first one of the multiple fuel injections.

11. The exhaust gas cleaning device according to claim 1, further comprising:
an engine power sensing means for sensing the output power of the internal combustion engine; and
an injection amount correcting means for decreasingly correcting the amount of fuel injection in each of the multiple fuel injections of the second injection pattern without falling below a minimum threshold amount assigned to that particular fuel injection of the second injection pattern in a case where the second injection pattern is selected by the injection pattern selecting means when the sensed output power of the internal combustion engine is excessive relative to a target output power of the internal combustion engine, wherein the injection amount correcting means sets a correction amount for correcting the amount of fuel injection in each of the multiple fuel injections of the second injection pattern sequentially by starting from the first one of the multiple fuel injections toward a last one of the multiple fuel injections.

12. The exhaust gas cleaning device according to claim 10, wherein the injection amount correcting means sets the correction amount for correcting the amount of fuel injection in each of the multiple fuel injections of the second injection pattern based on a deviation between the sensed output power of the internal combustion engine and the target output power of the internal combustion engine.

13. The exhaust gas cleaning device according to claim 1, further comprising:
a ratio sensing means for sensing a ratio between an amount of a portion of injected fuel, which is injected into a cylinder of the internal combustion engine and is converted into exhaust heat for increasing the temperature of the exhaust gas, and another portion of the injected fuel, which is injected into the cylinder of the internal combustion engine and is outputted from the internal combustion engine as uncombusted component, in a case where one of the second and third injection patterns is selected by the injection pattern selecting means; and
a correcting means for setting a correction amount of an injection interval associated with each subsequent fuel injection, which is performed in the selected one of the second and third injection patterns, in such a manner that the correction amount of the injection interval of the at least one subsequent fuel injection coincides with a predetermined amount, which is set for the selected one of the second and third injection patterns.

14. An exhaust gas cleaning device for an internal combustion engine, the exhaust gas cleaning device comprising:
a particulate filter that includes a filter substrate, which holds catalyst thereon for combusting and removing particulate matter through use of reaction heat of oxidation reaction of the catalyst to regenerate the particulate filter upon capturing of the particulate matter of exhaust gas exhausted from the internal combustion engine;
a catalyst activation level sensing means for sensing an activation level of the catalyst; and
an injection pattern selecting means for selecting one of first to third injection patterns, wherein:
the first injection pattern is for performing a single fuel injection per heat cycle of the internal combustion engine and is for mainly generating an output power of the internal combustion engine;
the second injection pattern is for performing multiple fuel injections in multiple injection stages, respectively, per heat cycle of the internal combustion engine;
a first one of the multiple fuel injections of the second injection pattern is substantially the same as the fuel injection of the first injection pattern;
the multiple fuel injections of the second injection pattern further include at least one subsequent fuel injection, which is performed on a retarded side of the first one of the multiple fuel injections of the second injection pattern and has a higher ratio of waste heat in comparison to that of the first one of the multiple fuel injections, so that a temperature of the exhaust gas outputted from the internal combustion engine is increased, and a desired output power of the internal combustion engine is generated with the second injection pattern;

the third injection pattern is for performing multiple fuel injections in multiple injection stages, respectively, per heat cycle of the internal combustion engine;

a first one of the multiple fuel injections of the third injection pattern is substantially the same as the fuel injection of the first injection pattern;

the multiple fuel injections of the third injection pattern further include at least one subsequent fuel injection, which is performed on a retarded side of the first one of the multiple fuel injections of the third injection pattern;

an injection interval between an end point of the first one of the multiple fuel injections of the third injection pattern and a start point of a subsequent one of the at least one subsequent fuel injection of the third injection pattern is greater than that of the second injection pattern, so that a ratio of uncombusted fuel component of the exhaust gas generated upon combustion of fuel of the subsequent one of the at least one subsequent fuel injection in the third injection pattern becomes higher than that of the second injection pattern, and the thus generated uncombusted fuel component is supplied to the particulate filter, and the desired output power of the internal combustion engine is generated with the third injection pattern;

the injection pattern selecting means selects one of the second and third injection patterns upon receiving a request for regenerating the particulate filter;

the injection pattern selecting means selects the second injection pattern when the activation level of the catalyst, which is sensed by the catalyst activation level sensing means, is relatively low and thereby is equal to or less than a threshold value;

the at least one subsequent fuel injection of the second injection pattern includes multiple subsequent fuel injections; and injection intervals of the multiple subsequent fuel injections of the second injection pattern are increased one after another toward a last one of the multiple subsequent fuel injections of the second injection pattern.

15. An exhaust gas cleaning device for an internal combustion engine, the exhaust gas cleaning device comprising:

a particulate filter that includes a filter substrate, which holds catalyst thereon for combusting and removing particulate matter through use of reaction heat of oxidation reaction of the catalyst to regenerate the particulate filter upon capturing of the particulate matter of exhaust gas exhausted from the internal combustion engine;

a catalyst activation level sensing means for sensing an activation level of the catalyst;

an injection pattern selecting means for selecting one of first to third injection patterns; and an injection stage number setting means for setting a number of multiple injection stages in the second injection pattern based on a temperature of the exhaust gas, wherein:

the first injection pattern is for performing a single fuel injection per heat cycle of the internal combustion engine and is for mainly generating an output power of the internal combustion engine;

the second injection pattern is for performing multiple fuel injections in the multiple injection stages, respectively, per heat cycle of the internal combustion engine;

a first one of the multiple fuel injections of the second injection pattern is substantially the same as the fuel injection of the first injection pattern;

the multiple fuel injections of the second injection pattern further include at least one subsequent fuel injection, which is performed on a retarded side of the first one of the multiple fuel injections of the second injection pattern and has a higher ratio of waste heat in comparison to that of the first one of the multiple fuel injections, so that the temperature of the exhaust gas outputted from the internal combustion engine is increased, and a desired output power of the internal combustion engine is generated with the second injection pattern;

the third injection pattern is for performing multiple fuel injections in multiple injection stages, respectively, per heat cycle of the internal combustion engine;

a first one of the multiple fuel injections of the third injection pattern is substantially the same as the fuel injection of the first injection pattern;

the multiple fuel injections of the third injection pattern further include at least one subsequent fuel injection, which is performed on a retarded side of the first one of the multiple fuel injections of the third injection pattern;

an injection interval between an end point of the first one of the multiple fuel injections of the third injection pattern and a start point of a subsequent one of the at least one subsequent fuel injection of the third injection pattern is greater than that of the second injection pattern, so that a ratio of uncombusted fuel component of the exhaust gas generated upon combustion of fuel of the subsequent one of the at least one subsequent fuel injection in the third injection pattern becomes higher than that of the second injection pattern, and the thus generated uncombusted fuel component is supplied to the particulate filter, and the desired output power of the internal combustion engine is generated with the third injection pattern;

the injection pattern selecting means selects one of the second and third injection patterns upon receiving a request for regenerating the particulate filter; and the injection pattern selecting means selects the second injection pattern when the activation level of the catalyst, which is sensed by the catalyst activation level sensing means, is relatively low and thereby is equal to or less than a threshold value.

16. The exhaust gas cleaning device according to claim 15, wherein the injection stage number setting means increases the number of injection stages in the second injection pattern when the temperature of the exhaust gas decreases.

* * * * *